(12) United States Patent
Rado

(10) Patent No.: US 11,998,047 B2
(45) Date of Patent: Jun. 4, 2024

(54) PERSONAL VAPORIZER AND METHOD FOR ASSEMBLY

(71) Applicant: Vaporous Technologies, Inc., Torrance, CA (US)

(72) Inventor: J. Christian Rado, Torrance, CA (US)

( * ) Notice: Subject to any disclaimer, the term of this patent is extended or adjusted under 35 U.S.C. 154(b) by 985 days.

(21) Appl. No.: 16/438,461

(22) Filed: Jun. 11, 2019

(65) Prior Publication Data

US 2019/0373954 A1 Dec. 12, 2019

Related U.S. Application Data

(60) Provisional application No. 62/683,392, filed on Jun. 11, 2018.

(51) Int. Cl.
| | |
|---|---|
| *A24F 40/40* | (2020.01) |
| *A24F 15/015* | (2020.01) |
| *A24F 40/10* | (2020.01) |
| *A24F 40/42* | (2020.01) |
| *A24F 40/485* | (2020.01) |
| *A24F 40/70* | (2020.01) |
| *F16K 15/02* | (2006.01) |

(52) U.S. Cl.
CPC ............ *A24F 40/40* (2020.01); *A24F 40/42* (2020.01); *A24F 40/485* (2020.01); *F16K 15/025* (2013.01); *A24F 15/015* (2020.01); *A24F 40/10* (2020.01); *A24F 40/70* (2020.01)

(58) Field of Classification Search
CPC ........ A24F 40/10; A24F 40/485; A24F 40/42; A24F 40/40; A24F 40/50; F16K 15/025
See application file for complete search history.

(56) References Cited

U.S. PATENT DOCUMENTS

| | | | |
|---|---|---|---|
| 2,104,266 | A | 1/1938 | McCormick |
| 3,200,819 | A | 8/1965 | Gilbert |
| 4,947,874 | A | 8/1990 | Brooks |
| 7,832,410 | B2 | 11/2010 | Hon |
| 8,156,944 | B2 | 4/2012 | Han |
| 8,365,742 | B2 | 2/2013 | Hon |
| 8,528,569 | B1 | 9/2013 | Newton |
| 8,794,231 | B2 | 8/2014 | Thorens |
| 9,254,007 | B2 | 2/2016 | Liu |
| 9,750,284 | B2 | 9/2017 | Rado |
| 10,004,264 | B2 | 6/2018 | Rado |
| 10,085,481 | B2 | 10/2018 | Verleur |
| 10,188,145 | B2 | 1/2019 | Rado |

(Continued)

FOREIGN PATENT DOCUMENTS

KR 20130106009 A 9/2013

*Primary Examiner* — Michael H. Wilson
*Assistant Examiner* — Stephanie Lynn Moore
(74) *Attorney, Agent, or Firm* — FisherBroyles, LLC; Glen L Nuttall

(57) ABSTRACT

A personal vaporizer is constructed so that a tank module is filled with a vaporizing medium prior to being attached to a mouthpiece module. During filling, the tank module is in a first configuration in which a structure blocks media within the tank from flowing into an air path of the tank module. When the mouthpiece module is attached to the tank module after filling, the structure is modified, moving the tank module into a second configuration. However, in the second configuration an elongated tube of the mouthpiece module blocks media within the tank from flowing into the air path of the tank module.

19 Claims, 20 Drawing Sheets

(56) References Cited

U.S. PATENT DOCUMENTS

| | | |
|---|---|---|
| 10,219,541 B2 | 3/2019 | Rado |
| 10,244,792 B2 | 4/2019 | Rado |
| 10,321,721 B2 | 6/2019 | Rado |
| 2015/0245662 A1 | 9/2015 | Memari et al. |
| 2016/0183596 A1* | 6/2016 | Rado ............... F22B 1/284 392/404 |
| 2016/0360790 A1* | 12/2016 | Calfee ............... A24F 40/46 |
| 2017/0105448 A1* | 4/2017 | Scarpulla ............ B65D 41/20 |
| 2017/0208863 A1 | 7/2017 | Davis et al. |
| 2018/0020726 A1 | 1/2018 | Alarcon |
| 2018/0020730 A1 | 1/2018 | Alarcon et al. |
| 2018/0027874 A1 | 2/2018 | Zhu |
| 2020/0015524 A1 | 1/2020 | Rado |
| 2022/0000180 A1 | 1/2022 | Rogan et al. |

\* cited by examiner

PERSONAL VAPORIZER AND METHOD FOR ASSEMBLY

CROSS-REFERENCE TO RELATED APPLICATIONS

The application claims priority to U.S. application No. 62/683,392, which was filed Jun. 11, 2018, the entirety of which is hereby incorporated by reference.

BACKGROUND

The present disclosure relates to the field of personal vaporizers.

Personal vaporizers are handheld devices that vaporize a vaporizing medium such as an essential oil-based fluid or electronic cigarette fluid (e-liquid). The vapor is then inhaled by its user. A typical personal vaporizer has an atomizer having a heating element that selectively heats the medium in order to produce the vapor. A rechargeable battery is also typically employed for powering the atomizer.

Personal vaporizers for vaporizing fluid media typically include a fluid chamber that holds the fluid, and a wick that communicates fluid from the chamber to the atomizer. Sometimes the heating element is incorporated into the wick. The fluid solution typically includes chemicals such as one or more of propylene glycol, glycerin, polyethylene glycol 400, and an alcohol. Extracted flavorings can also be included in the fluid. Electronic cigarettes are a type of personal vaporizer, and use a liquid solution that includes tobacco-derived nicotine. Personal vaporizers also can be used with fluid solutions that include one or more of various essential oils, including cannabis- or hemp-derived oils.

Some styles of personal vaporizers employ a tank for holding a fluid vaporizing medium. An atomizer can be disposed below or near the bottom of the tank, and a center post extends through the tank to deliver vaporized medium from the atomizer to a mouthpiece placed atop the tank. While this general configuration has proven popular, it can be difficult to fill the tank, particularly in a mass production environment.

SUMMARY

There is a need in the art for a personal vaporizer that can be easily filled with fluid vaporizing media, particularly in a mass production environment. There is also a need for a method of filling such a personal vaporizer, including personal vaporizers that employ a center post construction.

In accordance with one embodiment, the present specification provides a personal vaporizer, comprising a tank module comprising a tank and an air path, a fill valve movable from a first position to a second position, the tank blocked by the fill valve from communicating with the air path when the fill valve is in the first position, and a proximal module comprising an elongated tube having a lumen, the proximal module configured to be attachable to the tank module. When the proximal module is attached to the tank module, the fill valve is in the second position and the air path communicates with the lumen of the elongated tube.

In another embodiment, when the proximal module is attached to the tank module, the elongated tube engages the fill valve and blocks the tank from communicating with the air path.

In some such embodiments the elongated tube and fill valve are configured so that when the proximal module is being attached to the tank module, the elongated tube pushes the fill valve from the first position to the second position.

In accordance with another embodiment, the present specification provides a method of assembling a personal vaporizer, comprising filling a tank of a tank module of the personal vaporizer with vaporizing medium while a fill valve of the tank module is in a first position in which the fill valve blocks vaporizing medium from flowing from the tank to an air path defined in the tank module, and attaching a proximal module of the personal vaporizer to the tank module. Attaching the proximal module to the tank module comprises advancing an elongated tube of the proximal module through the tank so that a distal end of the elongated tube engages a proximal end of the fill valve and urges the fill valve distally out of engagement with a seat of a seal to a second position wherein the air path communicates with the elongated tube through the fill valve.

Some such embodiments additionally comprise establishing an electrical connection between the elongated tube and the fill valve and the fill valve and a conductive pin.

In accordance with yet another embodiment, the present specification provides a personal vaporizer, comprising a tank module comprising a tank and an air path, the tank defining a tank lumen and having a tube mount portion, the air path extending from a distal inlet to the tube mount portion, and a proximal module comprising an elongated tube having a tube lumen, the elongated tube being configured to be attachable to the tube mount portion of the tank module. When the tank module is in a first configuration in which the proximal module is unattached to the tank module, communication between the tank lumen and the air path is blocked by a first structure. The proximal module and the tank module are configured so that the proximal module is attached to the tank module by advancing the elongated tube into an open end of the tank module and into connection with the tube mount portion, and when the elongated tube is advanced into the tube mount portion, the first structure is modified so as to place the tank module in a second configuration in which the first structure has been modified, and communication between the tank lumen and the air path is blocked by the elongated tube.

In some such embodiments, the first structure comprises a fill valve that is movable between a first position and a second position, and when the fill valve is in the first position it blocks communication between the tank lumen and the air path, and the fill valve is in the first position when the personal vaporizer is in the first configuration.

In additional embodiments, when the personal vaporizer is in the second configuration the fill valve is in the second position, and the elongated tube is engaged with the tube mount portion, and the elongated tube blocks communication between the tank lumen and the air path.

In yet additional embodiments, the first structure comprises a membrane that blocks communication between the tank lumen and the air path, and when the personal vaporizer is in the second configuration the membrane is broken.

DESCRIPTION

Figure 1:
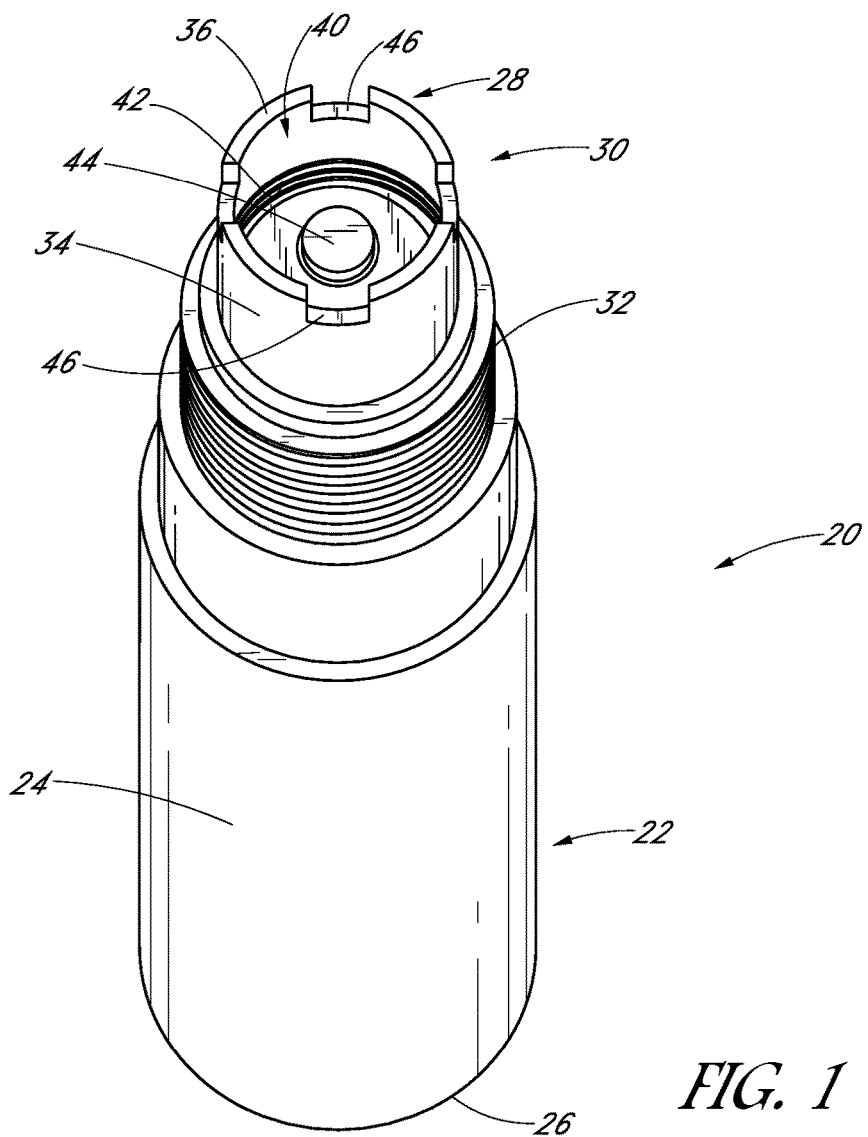
FIG. 1 is a perspective view of a battery assembly for use in some embodiments.
Figure 2:
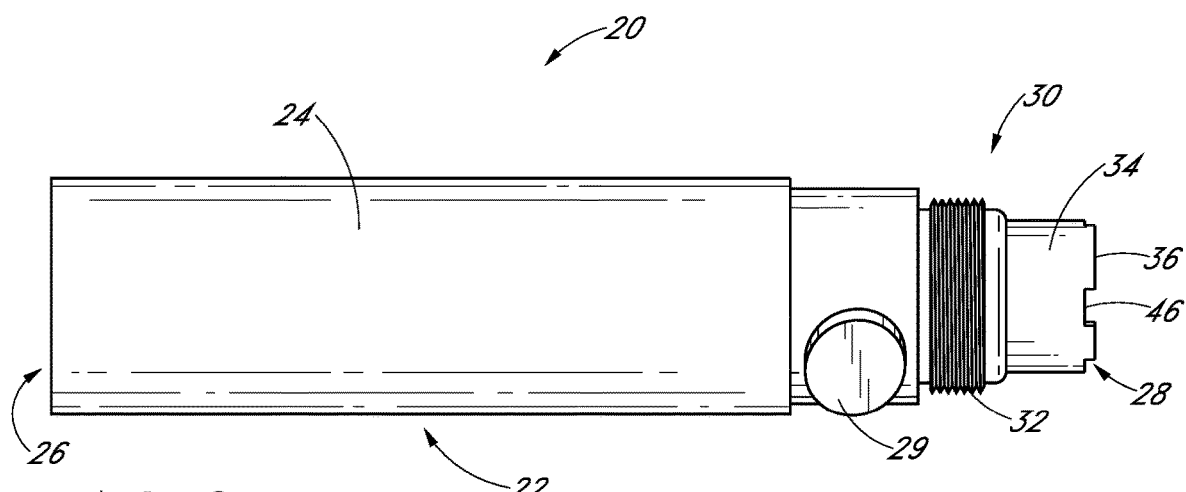
FIG. 2 is a side view of the battery assembly of FIG. 1.

With initial reference to FIGS. 1 and 2, an embodiment of a battery assembly 20, or battery pack, for a personal vaporizer is illustrated. Certain features of the illustrated battery assembly 20 are typical of battery assemblies currently available on the market. For example, the battery assembly 20 may include a rechargeable battery, such as a lithium-ion battery, enclosed within a battery casing 22. The battery casing 22 may include an elongated body 24 that extends from a base or distal end 26 to a top or proximal end 28. An electronic controller may also be included within the casing 22 to control voltage, current, timing and the like. A button 29 may be provided for selectively actuating electricity delivery from the battery 20 to the atomizer. In some embodiments, the button 29 can include a light that indicates when power is being delivered.

With continued reference to FIGS. 1 and 2, at and adjacent the proximal end 28 of the battery assembly 20, the battery casing 22 defines a mount boss 30. The mount boss 30 includes connecting structures for connecting vaporizing structures, such as atomizers and fluid chambers, to the battery. The elongated body 24 is disposed distally of the mount boss 30.

In the illustrated embodiment, the battery assembly mount boss 30 comprises an externally threaded portion 32 adjacent the body 24. Preferably, the externally threaded portion 32 has a diameter somewhat smaller than a diameter of the body 24. An extension 34 extends in a proximal direction from the externally threaded portion 32, preferably terminating in a top or proximal surface 36. As best shown in FIG. 2, the extension 34 preferably is tubular, defining a mount cavity 40 therewithin and having internal threads 42. Preferably, a diameter of the tubular extension 34 is less than the diameter of the externally threaded portion 32. A battery contact 44 is disposed within the tubular extension 34 at the base of the mount cavity 40. As shown, preferably a plurality of air intake slots 46 are formed in the extension at and adjacent the top surface.

One or more vaporizing structures are attachable to the battery mount boss 30. Such vaporizing structures typically include an atomizer and a fluid chamber, which can be provided as separate pieces or combined as a single structure. The vaporizing structures can be of various styles, sizes, and configurations. For example, in some embodiments, the atomizer and fluid chamber are provided as one prefabricated cartridge. In some embodiments, such cartridges are disposable. In some embodiments, the fluid chamber is refillable so that the cartridges are reusable. In other embodiments, the atomizer and fluid chamber are separately formed and selectively attachable and detachable from one another.

Vaporizing structures can also be attached to the battery assembly 20 in various ways. In some embodiments, an atomizer can threadingly engage the external threads 32 of the battery mount boss 30. In other embodiments, an atomizer may threadingly engage the internal threads 42 of the mount cavity extension 40. Preferably, a pin or other elongated contact extends into the mount cavity 40 to engage the battery contact 44 so as to communicate power from the battery 20 to the atomizer. Additional embodiments can employ non-threaded connection structures such as detents, friction fits, J-locks, and the like.

Applicant's US 2016/0183596 (the '596 publication) describes embodiments of personal vaporizers that can be used in conjunction with a battery assembly as discussed above, and describes attributes and structure of personal vaporizers that may be incorporated into embodiments employing inventive aspects described in this specification. The entirety of the '596 publication is hereby incorporated by reference.

Figure 3:
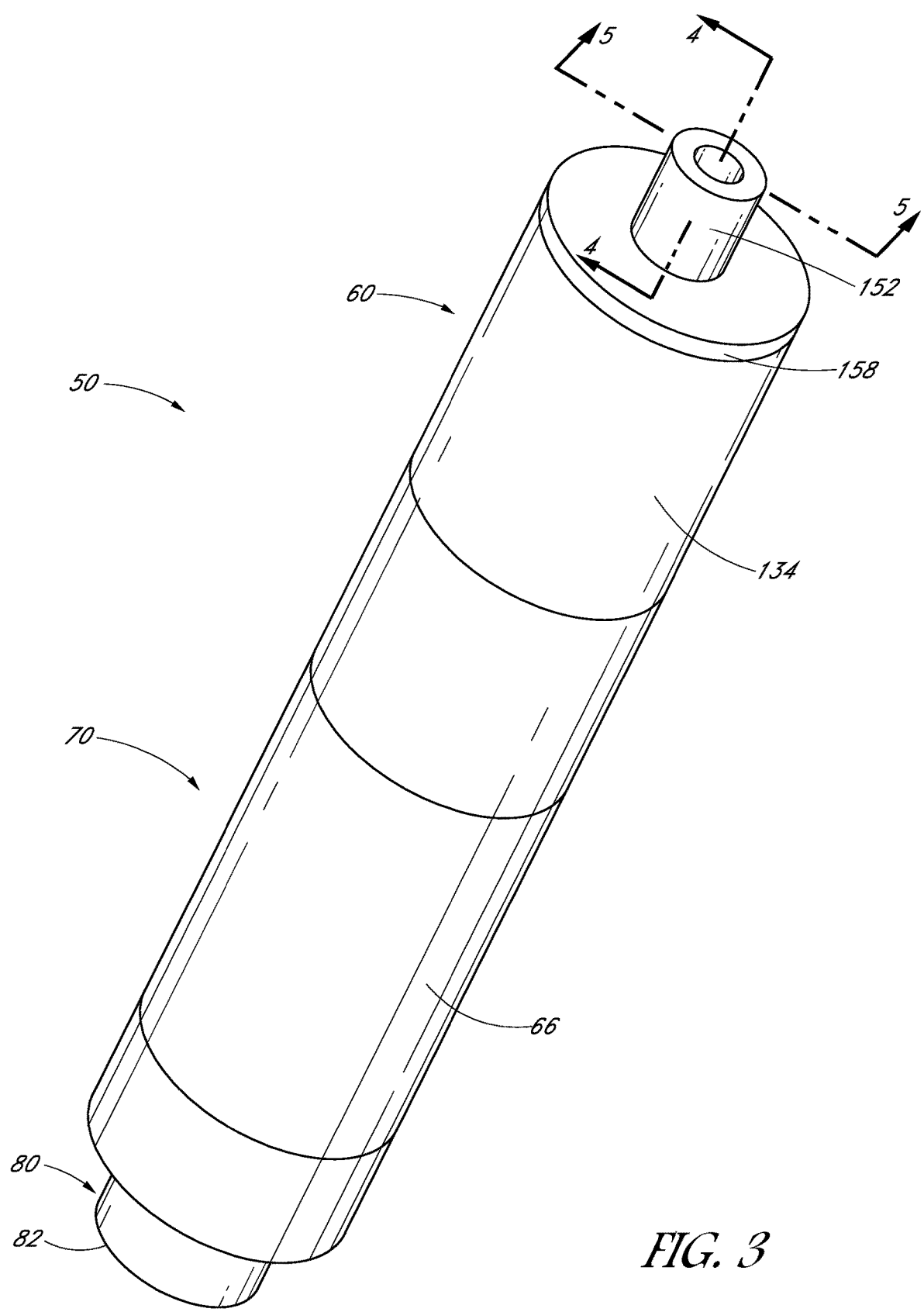
FIG. 3 is a perspective view of a vaporizing structure in accordance with an embodiment.
Figure 4:
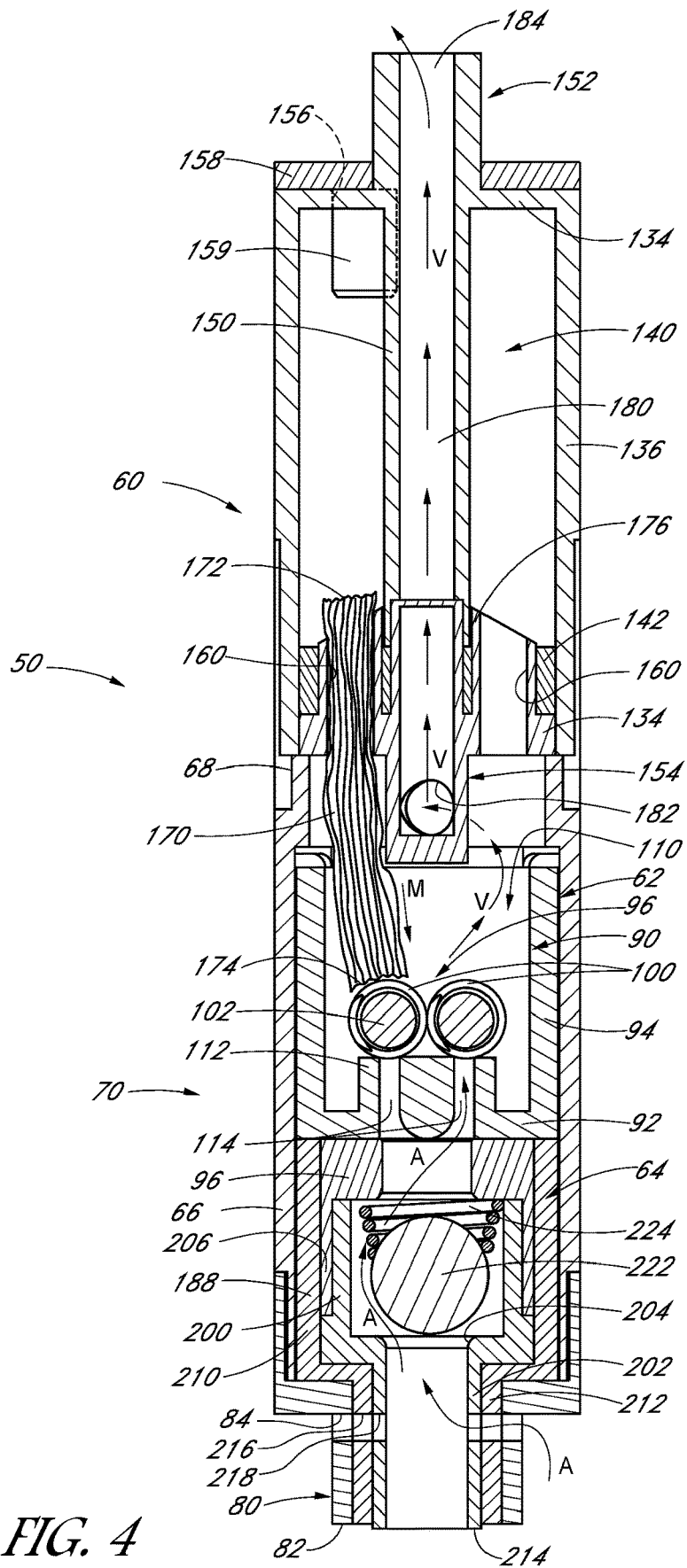
FIG. 4 is a cross-sectional view taken along lines 4-4 of FIG. 3.

With reference next to FIG. 3, an embodiment of a personal vaporizer 50 is shown. The illustrated personal vaporizer can be attached to a battery assembly 20. In this embodiment, the personal vaporizer 50 comprises a tank module 60 and an atomizer module 70 that are selectively detachable from one another. FIG. 4 is a cross-sectional view of the personal vaporizer 50 of FIG. 3.

Figure 5:
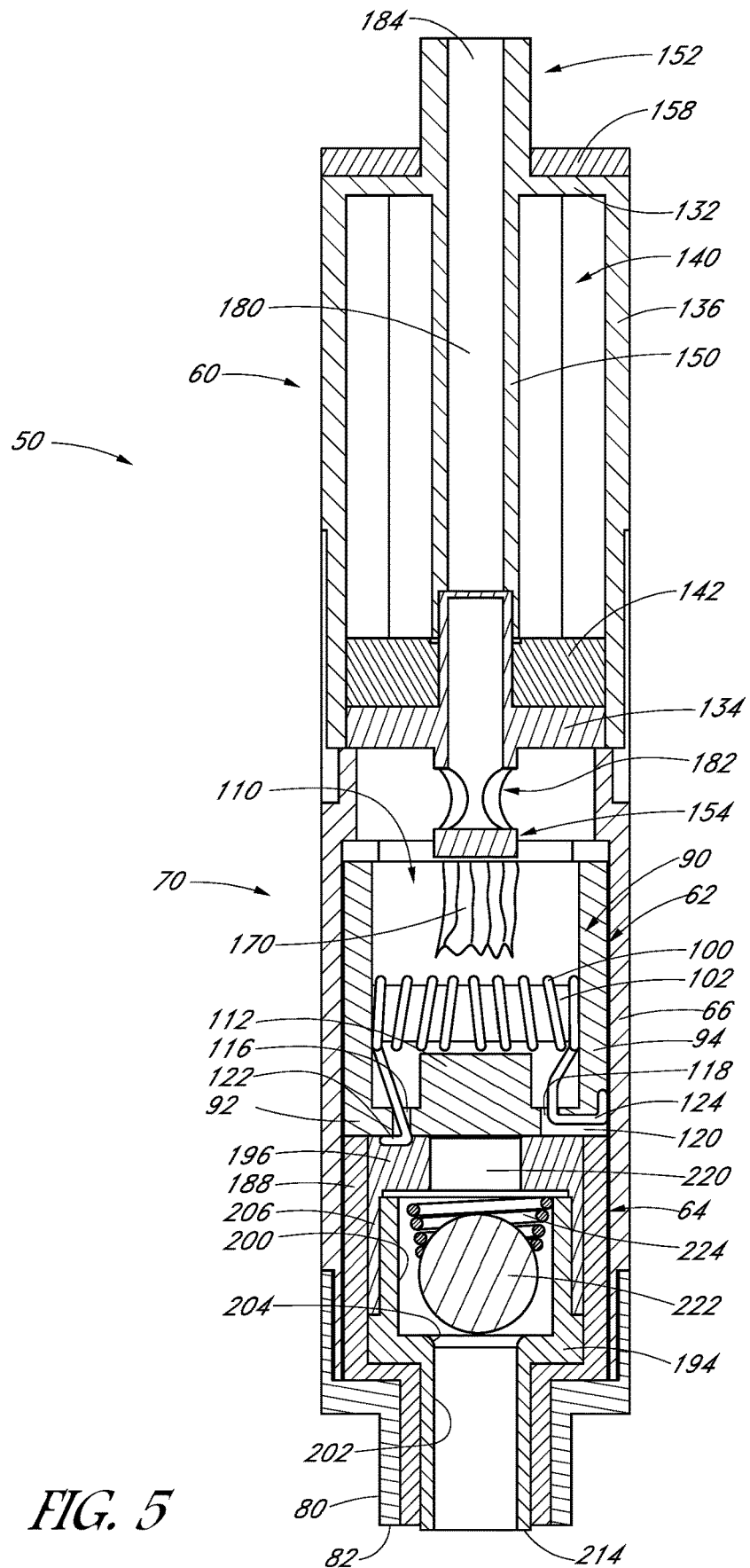
FIG. 5 is a cross-sectional view taken along line 5-5 of FIG. 3.
Figure 6:
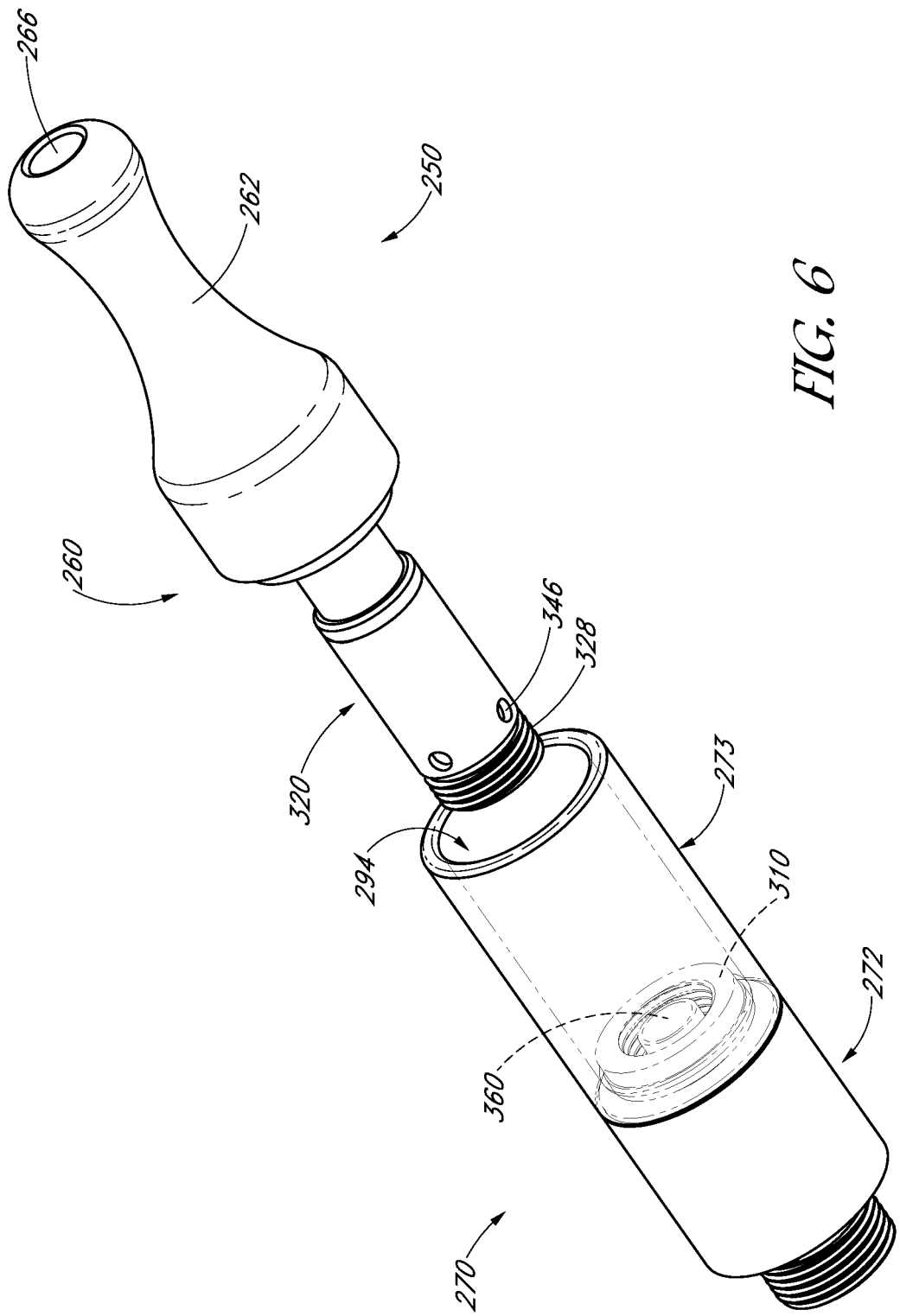
FIG. 6 is an exploded perspective view of a personal vaporizer in accordance with another embodiment.
Figure 7:
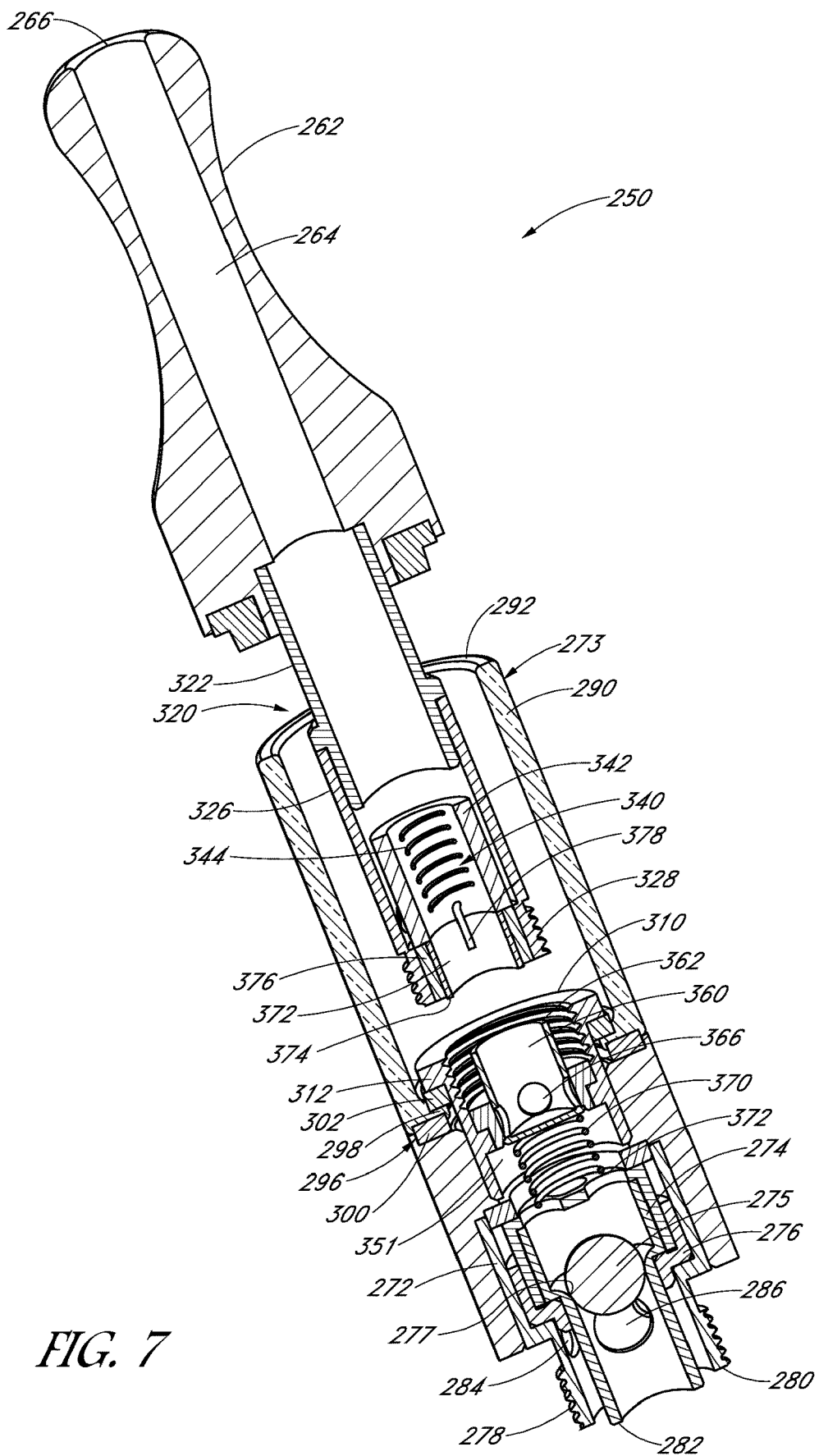
FIG. 7 is a cross-sectional view taken along line 7-7 of FIG. 6.

Continuing with reference to FIGS. 3-5, the atomizer module 60 comprises an atomizer 62 and a check valve 64 enclosed within an atomizer module housing 66. The atomizer housing 66 comprises a proximal end 68 that preferably is threaded so as to be selectively attachable to the tank module 60. A pin 80 at a distal end 82 of the atomizer housing 66 is configured to attach to the battery mount boss 30. In the illustrated embodiment the pin 80 is configured to attach to the internal threads 42 in the mount cavity 40 of the battery mount boss 30. Air passages 84 are formed through the pin 80. Thus, when the atomizer module 66 is attached to the battery assembly 20, air can flow through the battery slots 46 and the air passages 84 and into the atomizer module 70.

In the illustrated embodiment, the atomizer 62 is a skillet-style atomizer comprising a cylindrical bowl- or cup-shaped container, or bowl 90, defining bottom and side walls 92, 94 and being open at the top. Preferably, the bowl 90 is an insulator, and can be made of an insulator material such as a ceramic. A heating element 96 is contained within the bowl 90. In the illustrated embodiment the heating element 96 comprises a pair of wire coils 100 wrapped about transversely-extending insulating cores 102, or wicks. The wire coils 100 can be constructed of a durable, electrically-conductive material such as a metal (such as titanium, kanthal, or nichrome) that provides durability and electrical conduction to selectively power the atomizer 62. A vaporizing chamber 110 is defined within the bowl 90, above and around the coils 100. When the vaporizing structure 50 is attached to a battery assembly 20, the coils 100 are electrically connected to the battery and, when energized, vaporizing media at or adjacent the coils will be atomized/vaporized.

In some embodiments, a single wire can be used to create both of the coils. In additional embodiments, each coil is formed by its own wire. Of course, additional embodiments may employ only one, or more than two, coils. Also, it is to be understood that other embodiments may employ other types of heating element structures, including electricity-based and/or gas-based structures.

A raised foundation 112 extends upwardly from the bottom wall 92, and the coils 100 are positioned atop the raised foundation 112. Air slots 114 extend through the raised foundation 112. In the illustrated embodiment two air slots 114 are formed, and each air slot aligns with a respective one of the coils so as to deliver air flow directly to the respective coil.

As best shown in FIG. 5, first and second wire holes 116, 118 extend through the bottom wall 92 of the bowl 90. A channel 120 is formed on the distal surface of the bottom wall 92 of the bowl 90, and extends from the second wire hole 118 to a side of the bowl 90. A first end portion 122 of the coil wire extends through the first wire hole 116, and a second end portion 124 of the coil wire extends through the second wire hole 118 and through the channel 120. As will be discussed below, electrical energy from the battery 20 can be applied across the first and second wire portions 122, 124 to energize the coil. As shown, the wire holes 116, 118 are at opposite sides of the raised foundation 112. It is to be understood, however, that the wire holes can be located anywhere along the bottom wall or, in other embodiments, side wall of the bowl.

With continued reference to FIGS. 3-5, the tank module 60 comprises a tank top wall 132, tank bottom wall 134, and cylindrical outer wall 136 that cooperate to define a fluid chamber 140, or tank. The fluid chamber 140 is configured to hold a liquid solution such as a vaporizing solution comprising essential oils. A seal 142 adjacent the tank bottom wall 134 is configured to sealingly engage the outer wall 136. The outer wall in the illustrated embodiment can be made of a glass or polymer material that preferably is at least partially transparent so that a user can see the level of essential oil-based vaporization liquid remaining within the fluid chamber.

A center post 150 extends generally axially through the fluid chamber 140, extending through the tank top wall 132, through the fluid chamber 140 and through the tank bottom wall 134. As such, a proximal portion 152 of the center post 150 extends proximally from the tank top wall 132 and a distal portion 154 of the center post 150 extends distally from the tank bottom wall 134. Preferably, fluid in the fluid chamber 140 is isolated from the center post 150.

The tank 140 can have an opening 156 through the top wall 132 through which vaporizing media can be added to the fluid chamber. A tank cap 158 can be removably placed atop the top wall of the tank. Preferably, a plug 159 extending from the tank cap 158 can be fit into and through the tank opening 156 so as to removably seal the opening. The cap 158 and plug 159 can be made of an elastomeric material such as silicone rubber.

With continued reference to FIGS. 3 and 4, one or more fluid delivery tubes 160 (two in the illustrated embodiment) are formed through the tank bottom wall 134 to communicate the fluid chamber 140 with the vaporizing chamber 110. A wick 170 (shown in only one of the fluid delivery tubes) can be disposed in each of the fluid delivery tubes 160. A proximal end 172 of the wick 170 extends into the fluid chamber 140 and a distal end 174 of the wick 170 extends into the vaporizing chamber 110, terminating at or adjacent the heating element 96. The wicks 170 can deliver a controlled amount of vaporizing solution from the tank to the atomizer through capillary action, gravity, pressure differential between the tank and the vaporizing chamber, and other forces. In the illustrated embodiment, wick supports 176 comprise elongated portions of the fluid delivery tubes 160 that accommodate and support the wicks.

The center post 150 has a vapor passage 180 or lumen that extends from the proximal portion 152 of the center post 150 to the distal portion 154 of the center post 150 and does not communicate with the fluid chamber 140. As shown in FIGS. 4 and 5, the distal portion 154 of the center post 150 extends into the atomizer module 70 so as to be within and/or in communication with the vaporizing chamber 110. An inlet opening 182 is provided in the distal portion 154 so that the vapor passage 180 can receive vapor generated in the vaporizing chamber 110. In the illustrated embodiment, two inlet openings 182 are provided through a side wall of the center post 150. An outlet 184 of the vapor passage is defined at the proximal portion of the vapor passage 180. In the illustrated embodiment, the outlet 184 is aligned with an axis of the vapor passage 180. If desired, a mouthpiece can be connected to the proximal portion 154 of the center post 150 so that the vapor passage 180 will open into the mouthpiece.

In some examples, the proximal portion 152 can form a mouthpiece for a user to pull vapor from the vaporizing chamber through the vapor tube. In other examples, the proximal portion can be externally threaded and/or provided with a detent structure so that a separately-formed mouthpiece can be releasably attached. When a mouthpiece is attached to the proximal portion, the elastomeric cap can be squeezed against the tank top wall to provide an additional seal for the tank opening. Also, the cap can be elastically compressible, behaving as a lock washer for the mouthpiece.

With continued reference to FIGS. 3-5, the illustrated conductive check valve 64 includes a housing 188 enclosing a valve body made up of a pin 194 and cap 196, each of which preferably is made of an electronically conductive material such as a metal. In the illustrated embodiment, the conductive pin 194 comprises a hollow proximal cylinder 200 that necks down into a smaller diameter hollow distal cylinder 202. A valve seat 204 is defined where the proximal cylinder 200 necks down into the distal cylinder 202. The conductive cap 196 covers the open end of the proximal cylinder 200 so that a sealing structure (here a ball and spring) is captured between the conductive pin 194 and the conductive cap 196.

In the illustrated embodiment, the conductive cap 196 has an internally threaded side wall 206 extending distally and engaging with external threads formed on the proximal cylinder 200 of the pin 94. In some examples, the conductive cap 96 can be fixed to the proximal cylinder 200 by welding, interference or press fit, snap fit, adhesive, or other attachment means.

The housing 188 also comprises a hollow proximal cylinder 210 that necks down into a smaller-diameter hollow distal cylinder 212. In the illustrated embodiment, the housing 188 is configured to complementarily approximate the shape of the assembled pin 94 and cap 96, which fit snugly within the housing 188. Preferably, the housing 188 is formed of an electrically insulative material such as Delrin.

As shown, the check valve 64 is disposed immediately distal of the atomizer 62 within the atomizer module housing 66. The check valve 64 is placed within the atomizer module housing 66 so that the insulative check valve housing 188 engages the atomizer module housing 66 and electrically insulates the cap 96 and pin 94 relative to the atomizer module housing 66. A distal end 214 of the conductive pin 94 extends distally a short distance from the distal pin 80 of the atomizer module housing 96, and thus is configured to engage the contact 44, which is a first pole of the battery connector, when the atomizer module 70 is connected to the battery assembly 20. The atomizer module housing 66 preferably is electrically conductive so that the pin 80, when engaged with the internal threads 42 of the battery mount cavity 40, engages a second pole of the battery connector.

As discussed above, a first portion 122 of the heating coil wire extends through the first wire hole 116 of the atomizer bowl 90. As best shown in FIG. 5, the first wire portion 122 is sandwiched between the conductive check valve cap and the atomizer. As such, the first wire portion is electrically connected to the conductive check valve 64, which in turn is electrically connected to the first pole of the battery. The second wire portion 124 extends through the second wire hole 118 and into the channel 120. Preferably, the second wire portion 124 extends through and out of the channel 120 so that it is sandwiched between the bowl 90 and the conductive atomizer module housing 66, which is electrically connected to the second pole of the battery. Preferably, the channel 120 has a depth greater than a thickness of the second wire portion 124. As such, the channel 120 enables the second wire portion 124 to be spaced from the conductive portions of the check valve (such as the cap 196 and pin 164), and no electrical connection is made between the second wire portion 124 and the check valve 64.

An electric circuit is defined from the first pole of the battery through the electrically conductive check valve 64 to the first wire portion 122, through the coil 100 to the second wire portion 124, and from the second wire portion through the atomizer module housing 66 to the second pole of the battery. When the circuit is energized, electric current is applied across the heating element coil, which quickly generates heat to vaporize media within the vaporizing chamber.

It is to be understood that, in other embodiments, an insulator can be applied in the channel to electrically insulate the second connection from the valve body. Also, other structure can be employed. For example, the second wire hole may be formed through a side wall of the bowl so that the second wire portion never approaches the conductive valve body.

In the illustrated embodiment, the atomizer module housing 66 is made of a conductive material. In additional embodiments, portions of the atomizer module housing can be made of non-conductive materials, but a conductive layer or portion can be provided that communicates with the second pole of the battery, and which is positioned to be attachable to the second wire portion.

As noted above, the battery connector has a plurality of air intake slots 46 so that air can enter the battery mount cavity 40. As best shown in FIG. 4, the atomizer housing distal pin 80 has air passages 84 that communicate with air passages 216 formed through the insulative check valve housing, and with air passages 218 formed through the check valve pin 194 to enable air to flow from within the battery mount cavity 40 into the valve 64. The conductive cap 196 has a bore 220 extending therethrough. The bore 220 is aligned with the air slots 114 of the atomizer bowl 90 so as to communicate air within the hollow valve body 190 to the vaporizing chamber 110.

Continuing with particular reference to FIGS. 4 and 5, the illustrated valve 64 comprises a ball 222 and a compression spring 224. One end of the compression spring 224 abuts against or is attached to the conductive cap 196, and a second end of the spring 224 urges the ball 222 against a valve seat 204 so as to form a seal. The seal blocks vaporizing media from the vaporizing chamber, wick(s) or tank from leaking into the distal cylinder 202 of the check valve pin 194. This can be especially useful when the personal vaporizer is not in use, as otherwise vaporizing fluid from the tank 140 may slowly flow through the wick(s) and into the vaporizing chamber, through the air slots into the hollow pin, and further through the air passages 218, 216, 84 and out of the personal vaporizer. When the ball 222 is engaged with the valve seat 204, vaporizing media is blocked from leaking from the device by way of the air passages.

During use, and with particular reference to FIG. 4, a user drawing a breath generates sufficient suction force or decrease in pressure to dislodge the ball 222 from the valve seat 204. As the user energizes the heating element, and draws a breath, air flow A will push the ball 222 out of engagement with the valve seat 204. Also, vaporizing media M that may have accumulated in the vaporizing chamber 110 will be vaporized, and fluid that may have accumulated proximal of the ball 222 will be drawn into the atomizer bowl 90 and vaporized. When suction force from the user is removed, the spring 224 automatically urges the ball 222 back into engagement with the seat 204.

To use the vaporizing structure 50, the distal tip 80 preferably is connected to the battery mount, and preferably a mouthpiece is attached to the proximal portion 152. The user presses the battery button 29 and draws a breath through the mouthpiece. The heat element coils 100 quickly heat up, vaporizing fluid vaporizing media M delivered by the wick 170 to the vaporizing chamber 110. Atmospheric air A is drawn through the battery air intake slots 46 and into the hollow pin 194 through the air passages 84, 216, 218. The ball 222 is dislodged from the seat 204 and air A flows around the ball 222 and through bore 220 and air slots 114, past the coils 100 and into the vaporizing chamber 110, where it is mixed with atomized vaporizing media M, becoming a vapor V. The vapor V flows proximally through the inlet opening 182 and into the vapor passage 180, from which it is delivered via the mouthpiece to the user.

Prior to use, the fluid chamber 140 must be filled with fluid vaporizing medium M. In some embodiments, the user may fill the tank 140 by hand by removing the plug 159 from the tank fill opening 156 formed through the tank top wall 132. During manufacturing it may be desired to fill the tank 140 via automated, high-volume filling equipment. This may involve aligning a filling nozzle, or filling needle, with the open fill opening 156, and then filling the tank through the narrow fill opening 156. Due to the relatively small size of the fill opening, aligning the fill nozzle with appropriate precision may be difficult to achieve, particularly at high automation speeds, and even minor misalignments may result in substantial spillage of oil. As such, this automated filling operation may be comparatively slow and inconsistent. Such difficulty and slow filling speed can be exacerbated when the vaporizing medium is a highly viscous oil, as such oil tends to stick to side surfaces, such as the tank outer wall, and filling must proceed slowly in order to avoid overflow. In some embodiments the entire top wall 132 can be removed for filling, but the center post 150 remains in place. While this may increase the acceptable target area for the filling nozzle relative to the small fill opening 156, the presence of the center post still causes the target area to be quite small, leading to challenges in properly aligning the fill nozzle.

The present specification also contemplates embodiments of a personal vaporizer in which the center post is installed after the tank is filled. As such, the center post does not interfere with filling apparatus. The target area for a filling nozzle is thus much enlarged, reducing the need for precise alignment, and facilitating high-speed automated filling with low risk of spillage. Also, during filling, the fill nozzle can be spaced sufficiently from the side wall of the tank so that vaporizing medium can be injected directly to the bottom of the tank during filling, avoiding the risk that high-viscosity oil may contact the side wall and slide slowly down the side wall, delaying the filling process. Thus, an automated filling process can be sped up dramatically, and filling misalignments can be minimized.

With reference next to FIGS. 6-14, an embodiment of a personal vaporizer 250 has a proximal module 260, or mouthpiece module, and a distal module 270, or tank module. The distal module 270 comprises a base housing 272 that supports a tank 273. The illustrated base housing 272 preferably encloses an energized check valve 274, which is supported within the conductive base housing 272 via an insulated guide 276 so that the energized check valve 274 is electrically insulated relative to the conductive base housing 272. A distal battery connector 278 preferably is configured to be connectable to a standard battery module 20. An outer pin 280 of the battery connector 278 preferably is threaded so as to threadingly connect to the battery mount boss 30 and electrically connect with one of the battery poles. The energized check valve 274 defines an inner pin 282 that is configured to engage an opposite pole of the battery module 20. Intake air holes 284 are formed through the outer pin 280. The inner pin 282 also includes intake air holes 286. The illustrated check valve 274 includes a ball 275 configured to engage a seat 277, but without requiring a spring.

The tank 273 is defined by a tubular tank wall 290 having a proximal end 282 with a top, or proximal, opening 294, and a bottom end 296. In the illustrated embodiment, the bottom end 296 has an inwardly-extending bottom lip 298. A bottom washer 300 is placed on the proximal end of the base housing 272, and the bottom end 296 of the tank wall 290 rests thereupon. A second seal 302 is placed atop the lip 298. A mount boss 310 preferably is press-fit into the proximal end of the base housing 272 so that a flange 312 of the mount boss 310 engages the second seal 302, sandwiching the bottom lip 298 of the tank wall between the flange 312 and the proximal end of the base housing 272. In the illustrated embodiment, the mount boss 310 is internally threaded.

The proximal module 260 is made up of a mouthpiece 262 to which a center post 320 is connected. The center post 320 defines an elongated tube and is made up of an upper post portion 322 that is press-fit into the mouthpiece 262 so that the tube 320 communicates with a mouthpiece tube 264, and a lower post portion 326 that is joined to the upper post portion 322, and which defines a threaded distal end 328. The center post 320 is rigidly attached to the mouthpiece 262 so as to move with the mouthpiece 262. In order to assemble the personal vaporizer 250, the center post 320 of the mouthpiece module 260 is extended through the proximal opening 294 of the tank 273 and into engagement with the mount boss 310 of the base housing 272. In this embodiment, preferably the tank 273 is filled with the vaporizing medium M before the proximal module 260 is attached to the distal module 270.

Figure 8:
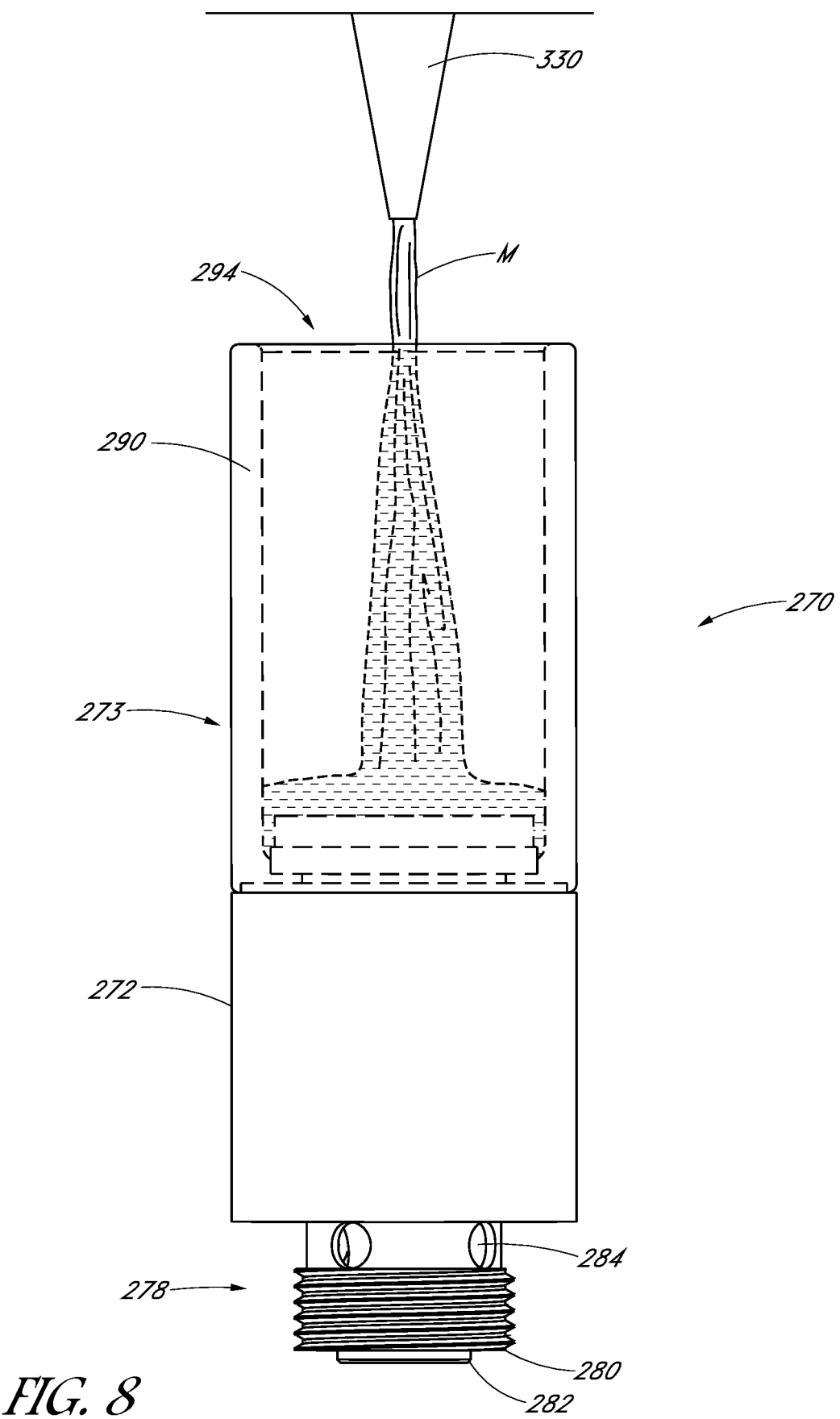
FIG. 8 is a side view of a tank module of the personal vaporizer of FIG. 6 being filled.

As best shown in FIG. 8, prior to assembly of the modules, and preferably after the distal module 270 is assembled during the manufacturing process, the tank 273 is filled with a vaporizing medium M. During manufacturing this can be accomplished by an automated fill nozzle 330, or needle, that can be aligned with the proximal opening 294 of the tank. Vaporizing medium M, such as an essential oil, is injected into the tank 273 through the proximal opening 294. As such, a target area of the fill nozzle 330 includes the entire proximal opening 294, without interruption by structures such as a center post. Preferably, the flow nozzle 330 is placed to align generally with a center axis of the tank 273 so that oil is injected to the bottom of the tank without contacting any tank side wall 290. This is particularly advantageous when filling the tank 273 with highly viscous oils. Notably, due to the relatively large size of the target area, misalignments of the fill nozzle 330 will have little or no consequence, and oil is still injected through the proximal opening 294.

Figures 9, 10:
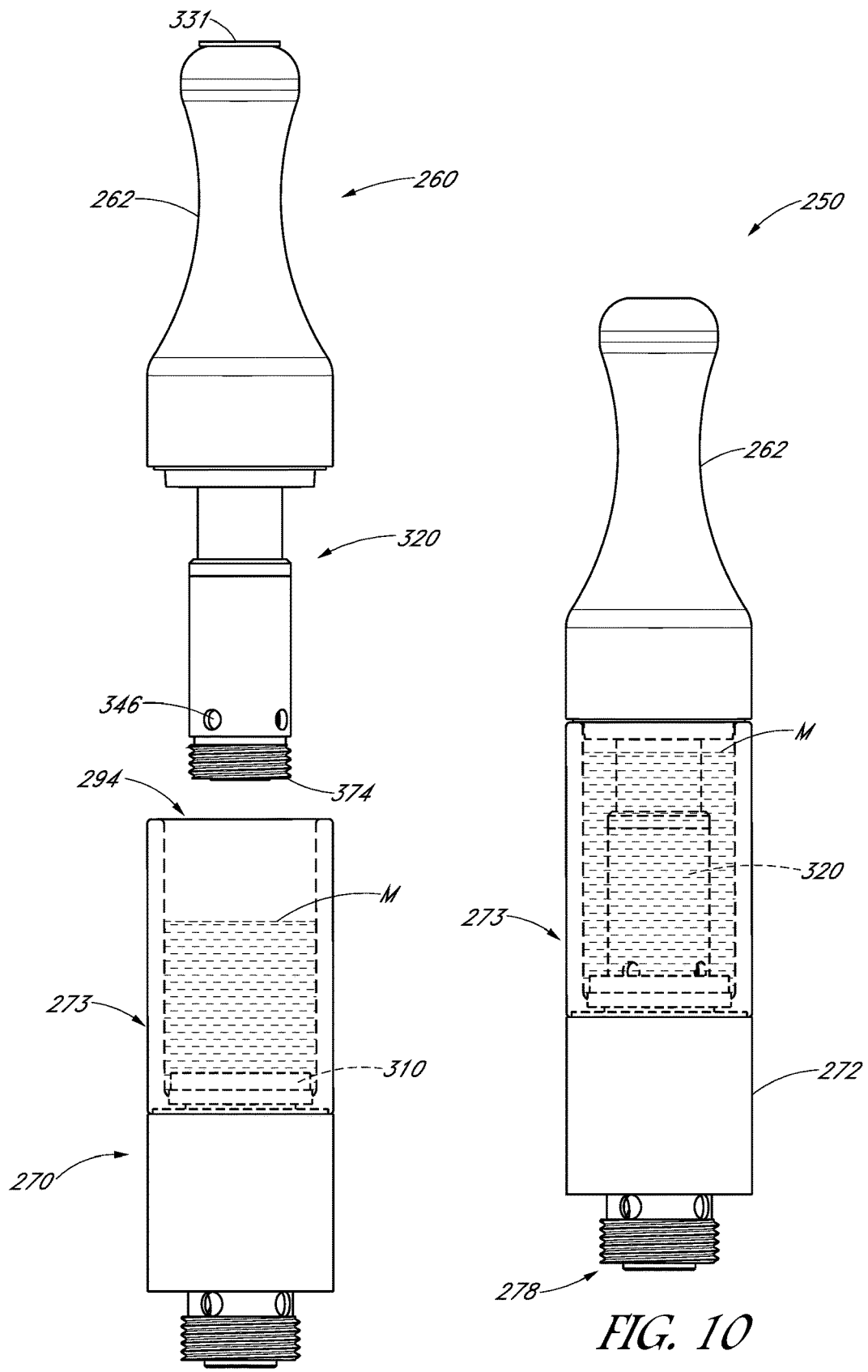
FIG. 9 is an exploded side view of the personal vaporizer of FIG. 6 after the tank has been filled.
FIG. 10 is a side view of the personal vaporizer of FIG. 6 fully assembled.
Figures 11, 14:
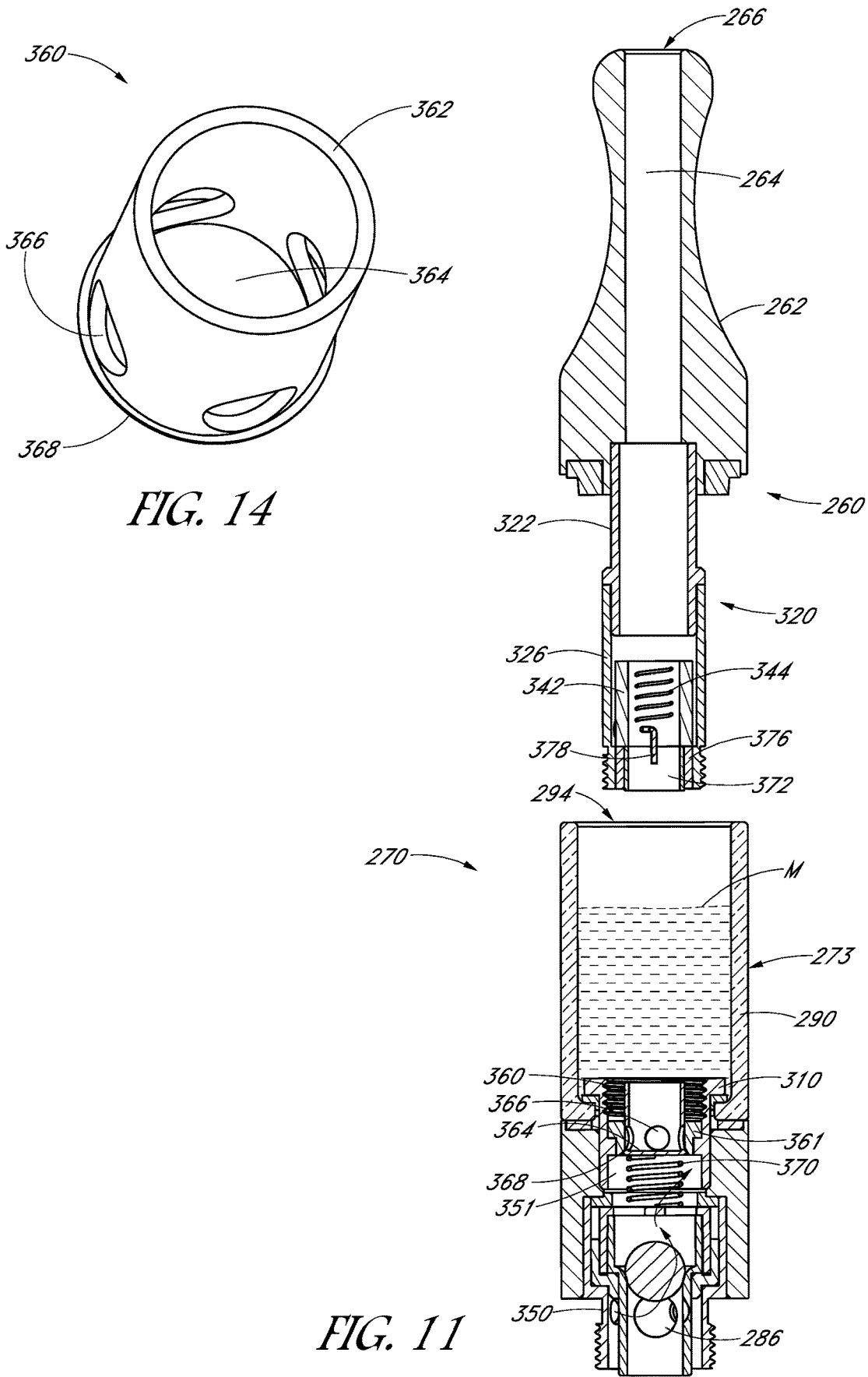
FIG. 11 is an exploded sectional view of the personal vaporizer of FIG. 9.
FIG. 14 is a perspective view of a fill valve in accordance with one embodiment.
Figure 12:
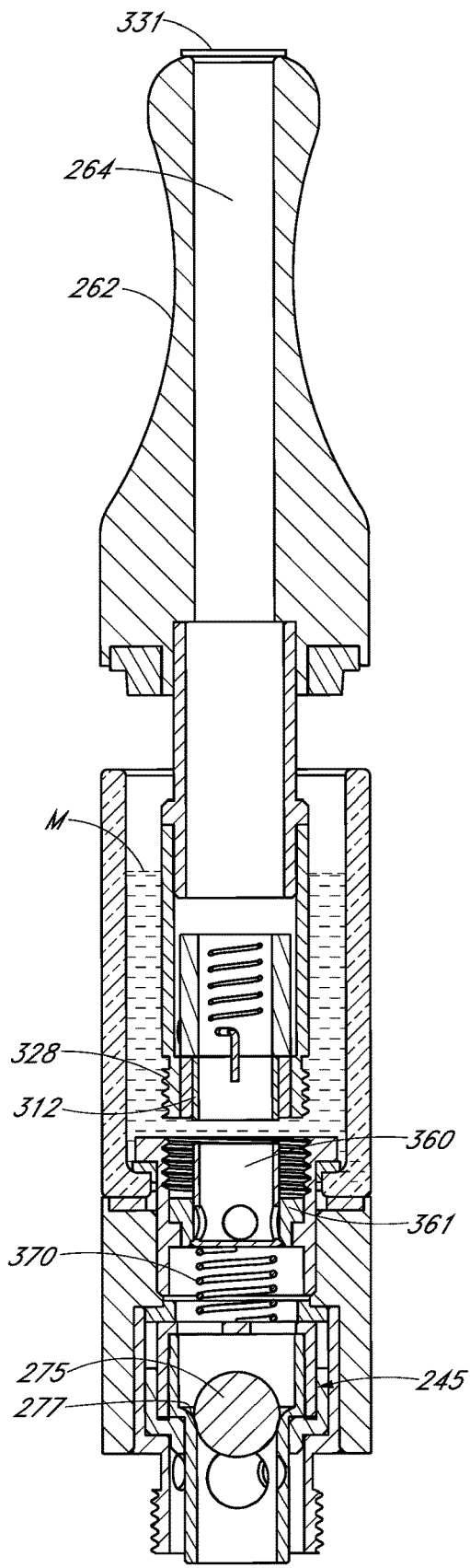
FIG. 12 is an exploded sectional view of the arrangement of FIG. 11 during assembly.

With reference next to FIGS. 9-10, after the tank 273 has been filled with vaporizing medium M, the mouthpiece module 260 can be advanced through the open proximal end 294 of the tank so that the distal end of the center post 320 becomes engaged with the mount boss 310. The distal end 328 of the center post 320 can be threadingly engaged with the threaded mount boss 310 to connect the proximal module 260 to the distal module 270. In one preferred embodiment, a sealing membrane 331 preferably is temporarily placed upon the proximal end of the mouthpiece 262 while the mouthpiece module 260 is advanced so as to maintain pressure within the mouthpiece module to prevent oil from flowing into the center post 320 while the post is advanced into the tank 273 through the oil.

A distal portion of the center post 320 defines a vaporizing chamber 340 enclosing a wick and a heating coil 344. A plurality of feeder holes 346 formed through the distal portion of the center post 320 provide a path for oil from within the tank 273 to flow to the wick 342. When the heating coil 344 is energized, vaporizing medium M is vaporized.

Figure 13:
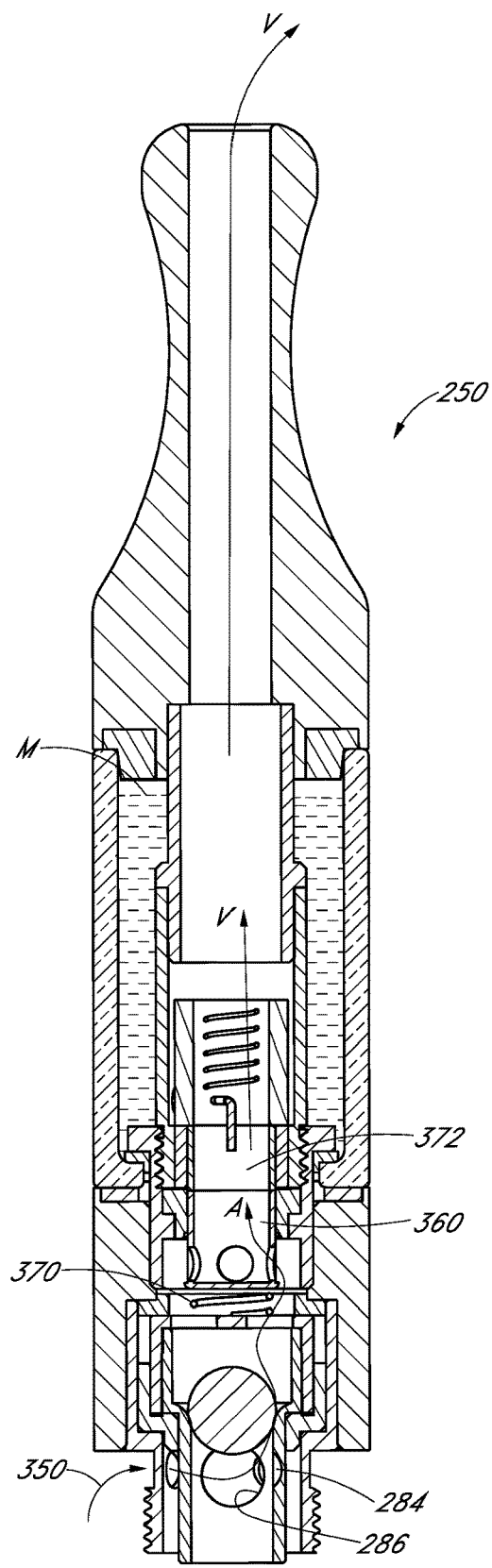
FIG. 13 is a sectional view of the arrangement of FIG. 12 fully assembled.
Figure 15:
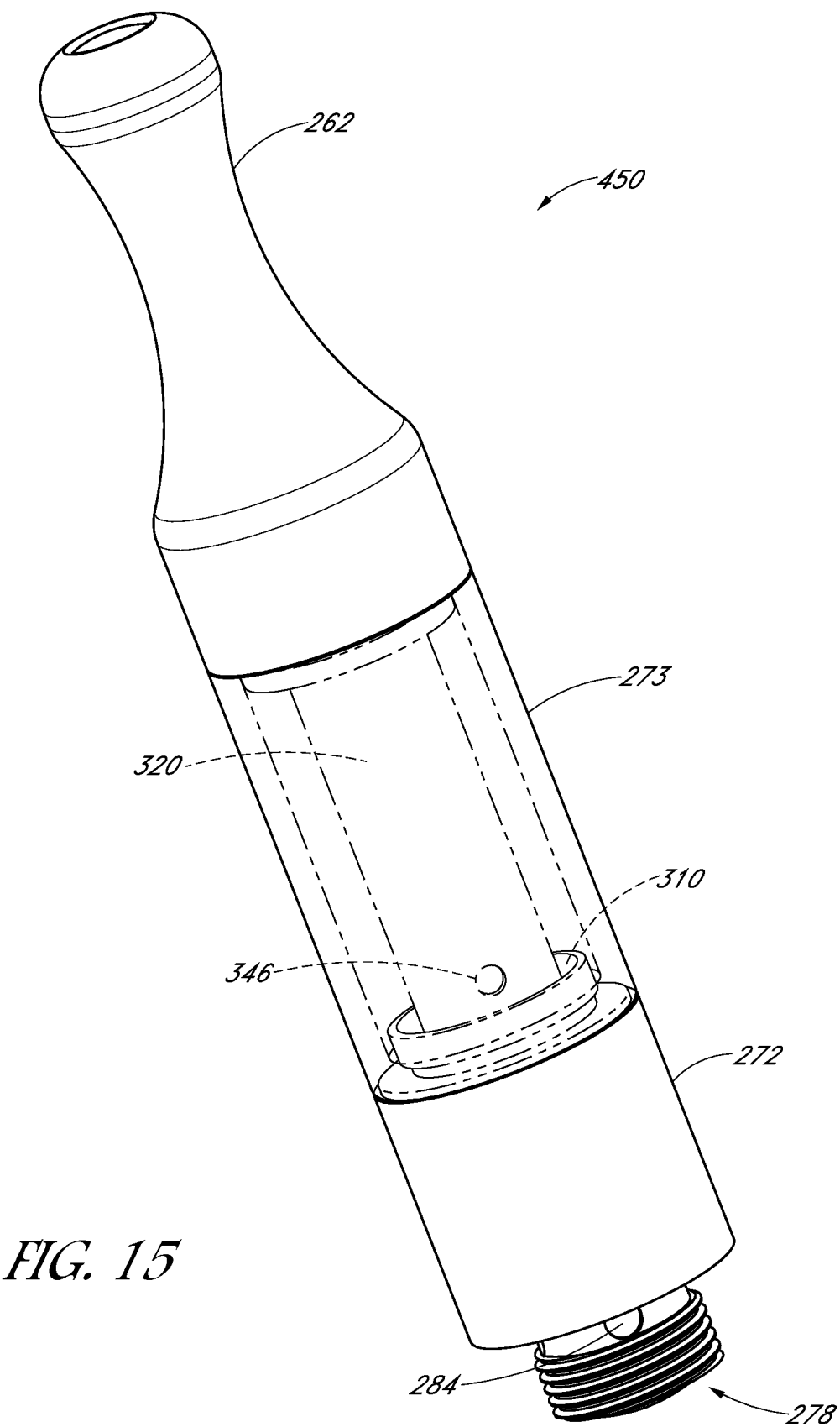
FIG. 15 is a perspective view of another embodiment of a personal vaporizer.
Figure 16:
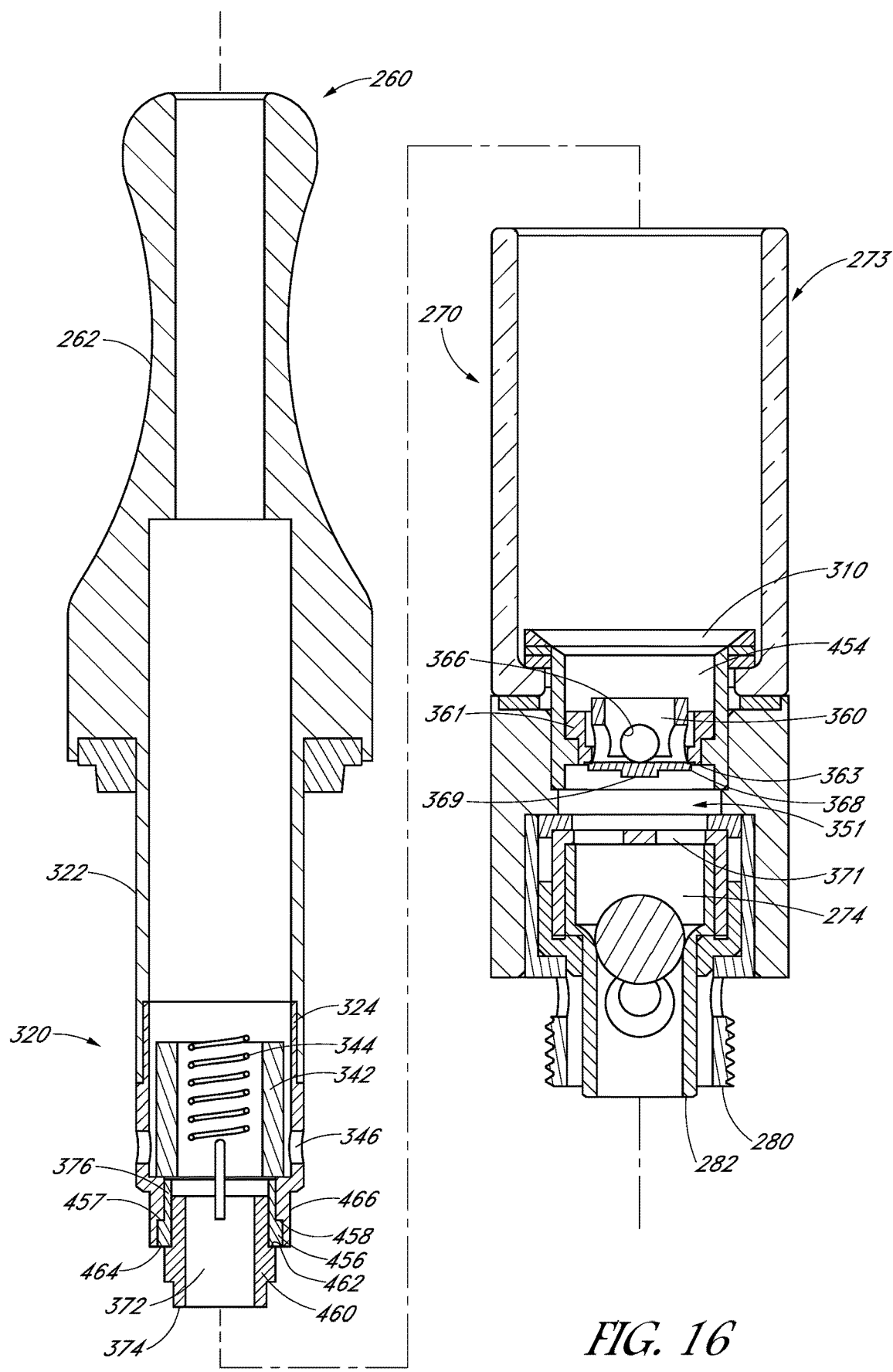
FIG. 16 is an exploded sectional view of the personal vaporizer of FIG. 15.
Figure 17:
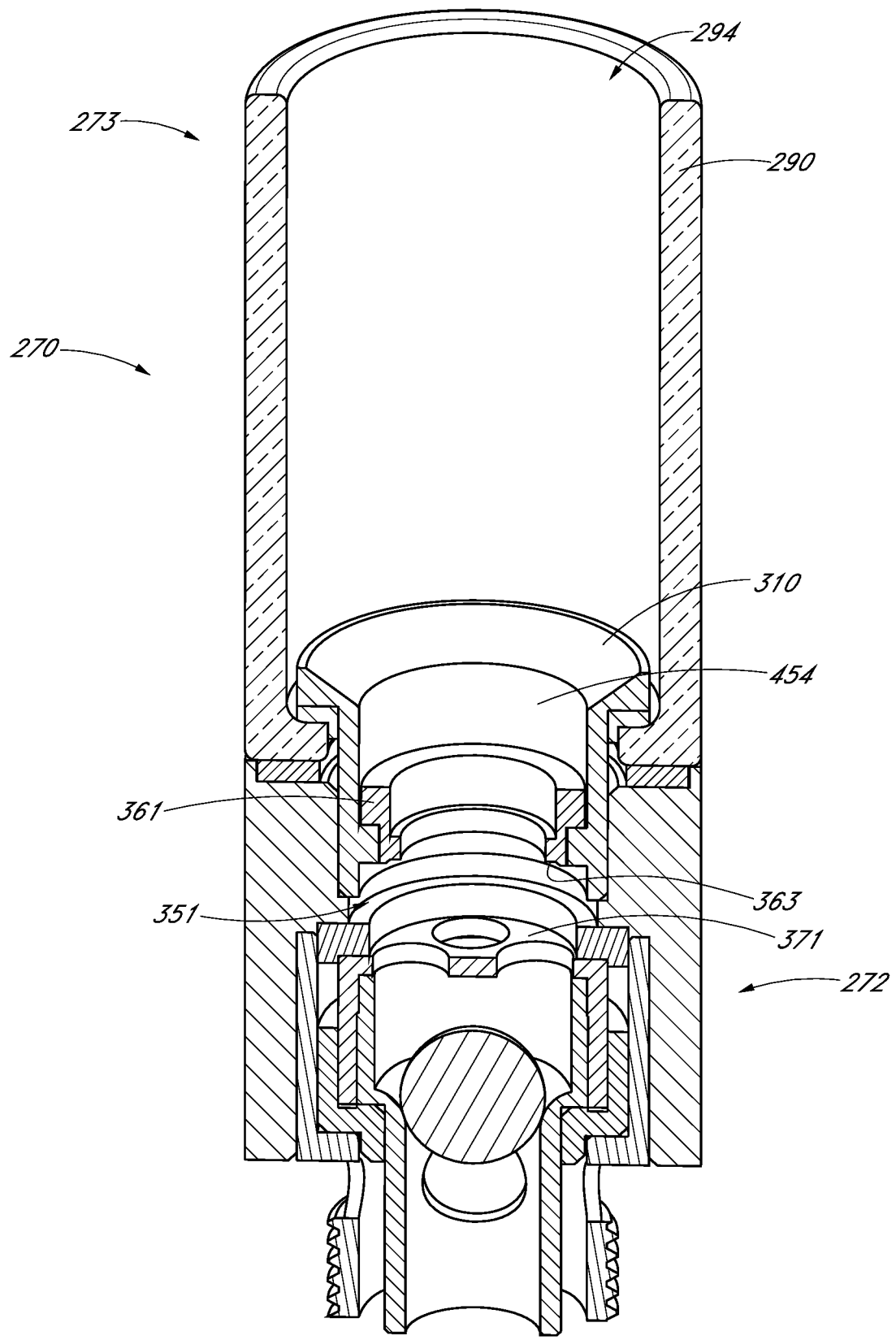
FIG. 17 is a sectional view of a portion of a tank module of the personal vaporizer of FIG. 15.
Figure 18:
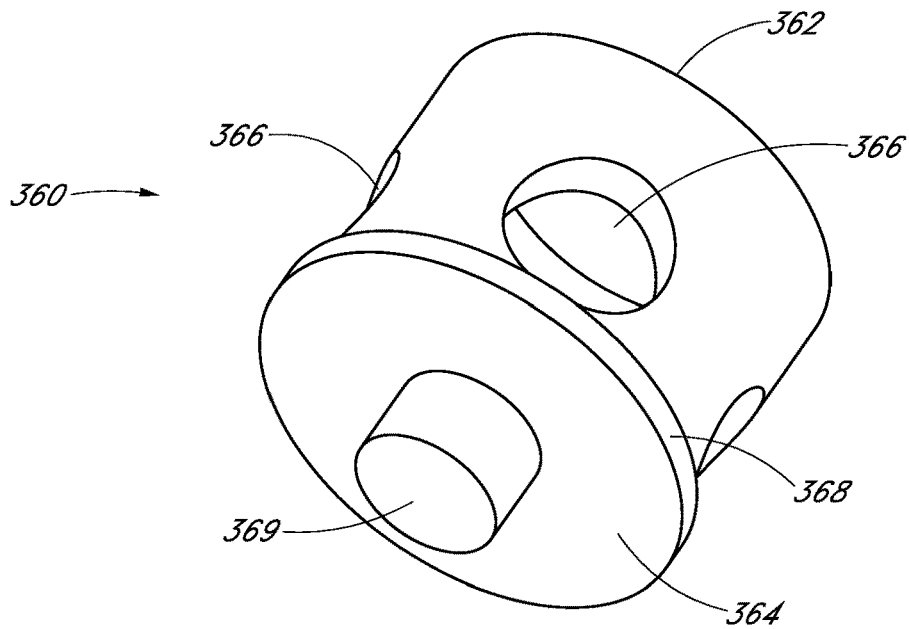
FIG. 18 is a perspective view of an embodiment of a fill valve.
Figure 19:
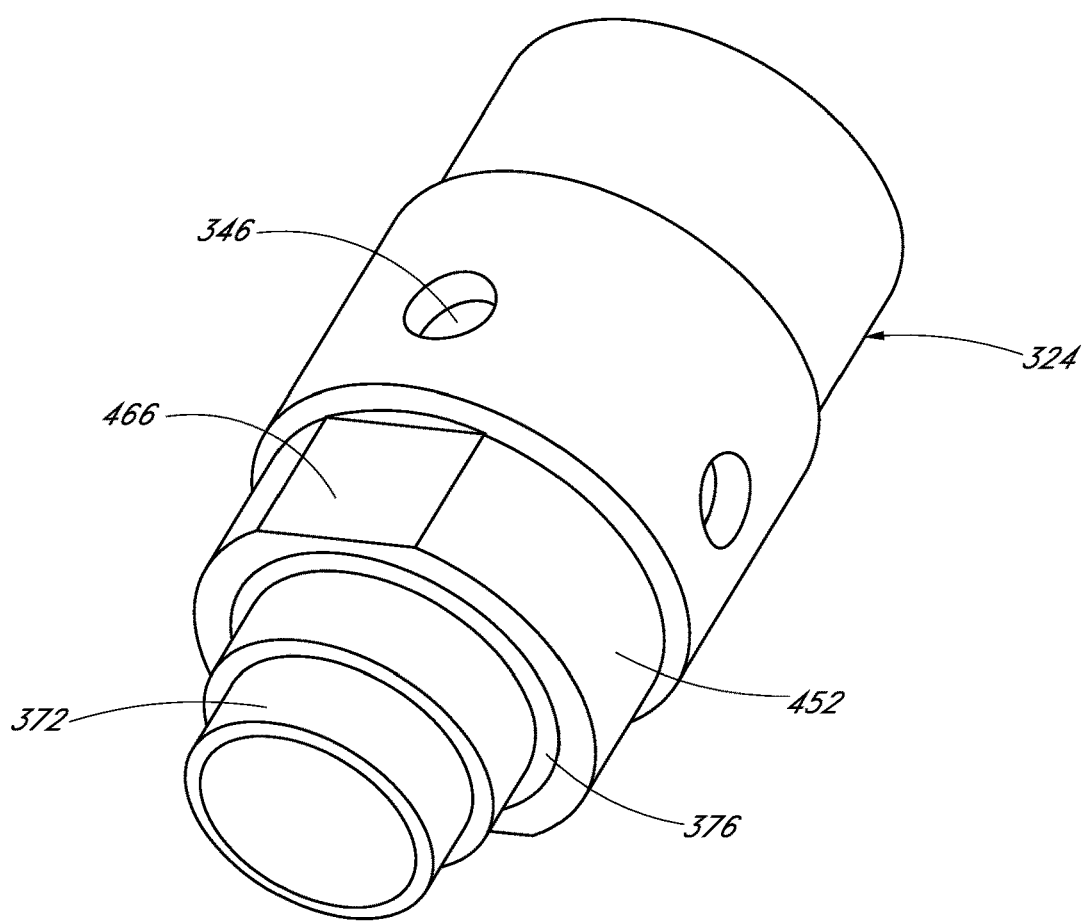
FIG. 19 is a perspective view of a lower post portion in accordance with one embodiment.
Figures 20, 21:
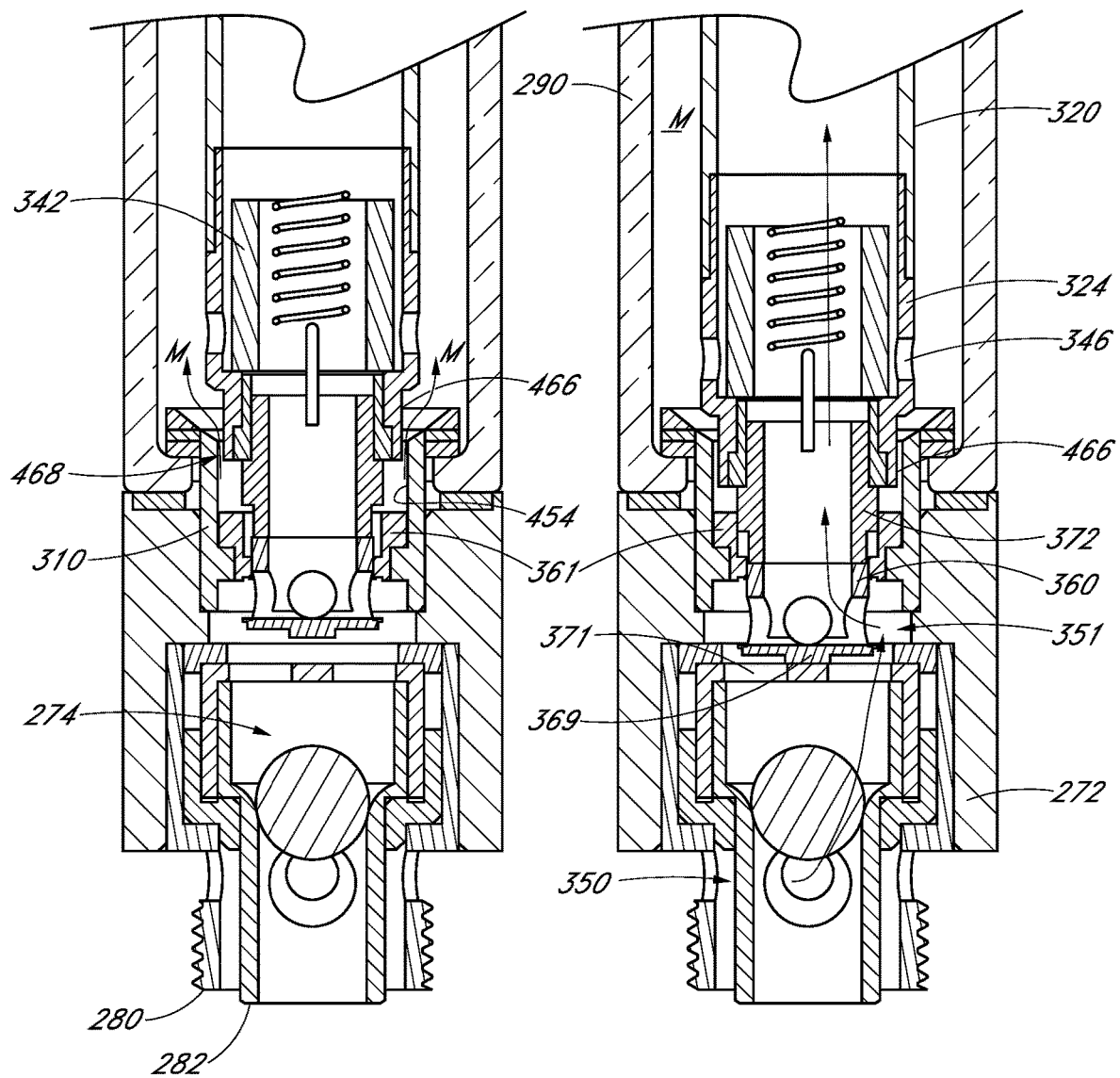
FIG. 20 is a partial sectional view of a tank module in accordance with one embodiment.
FIG. 21 shows the arrangement of FIG. 20 during use.

When the personal vaporizer 250 is fully assembled, as depicted in FIGS. 10 and 13, an intake air path 350 is defined beginning at air inlets 284 adjacent the distal battery connector 278 of the base housing 272. Intake air A flows proximally through an energized check valve 274 to an air space 351 above the check valve 274, eventually finding its way to the center post 320 and to a vaporizing chamber 340 defined at the heating coil 344. As a user draws a breath through the mouthpiece outlet 266, intake air A is drawn into the vaporizing chamber 340, where it is mixed with vaporized medium M to form a vapor V. The vapor continues to flow through the center post 320 proximal of the heating coil 344 into the mouthpiece 262 and out of the mouthpiece outlet 266.

In vaporizer designs such as discussed above in connection with FIGS. 3-5, particularly center-post designs in which the air intake path begins below, or distal, the atomizer, the center post prevents oil from the tank from draining through the air intake path. Thus, in such designs, the center post must remain in place during filling or oil will simply drain. With particular reference to FIGS. 6-14, in the illustrated embodiment, in order to prevent vaporizing medium from accessing and flowing through the air intake path 350, a fill valve 360 is placed within the mount boss 310. More specifically, an electrically insulative sealing ring 361 is disposed within the mount boss 310, and the fill valve 360 is placed in contact with the sealing ring 361 so as to establish a seal between the tank 273 and the air intake path 350.

The illustrated fill valve 360 is elongate and tubular, being open at its proximal end 362 and having a distal wall 364. A plurality of side holes 360 are formed adjacent the distal wall 364. In the illustrated embodiment, the distal wall 364 includes a lip 368 extending radially outwardly from the fill valve 360. To configure the tank module 270 for filling, the fill valve 360 is placed in contact with the sealing ring 361 so that the lip 360 of the distal wall 364 is in contact with sealing ring 361 and the side holes 346 thus do not communicate with any space below, or distal of, the sealing ring 361. As such access to the air intake path 350 distal of the sealing ring 361 is blocked. In the illustrated embodiment, a conductive spring 370 extends from a proximal face 372 of the energized check valve 274 to the distal wall 364 of the fill valve 360 in order to urge the fill valve proximally, urging the lip 368 into seating contact with the sealing ring 361 so as to establish and maintain the seal. As such, during filling, oil accumulates above the sealing ring 361 but does not drain into the air intake path 350, as the air intake path through the tank module 260 is interrupted by the sealing ring 361.

Of course, for the personal vaporizer 250 to operate properly when assembled, the air intake path 350 must be established so as to provide intake air to the heating coil 344 which, in the illustrated embodiment, is contained within the center post 320. As shown, a post pin 372 is disposed within the center post 320. Preferably, the post pin 372 is tubular and has a diameter matching the diameter of the fill valve 360. As the center post 320 is advanced into the tank 273, the distal end 374 of the post pin 372 engages the proximal end 362 of the fill valve 360. As the mouthpiece module 260 is threaded onto the mount boss 310, and thus further advanced distally, the post pin 372 pushes the fill valve 360 distally. As such, the lip 368 is disengaged from the sealing ring 361, and the side holes 366 of the fill valve 360 are placed into communication with the air space above 351 the energized fill valve 274. In this manner, the air intake path 350 is established from the air space 351 above the energized fill valve 274 into the side holes 360, then through the fill valve 360 and post pin 372 to the vaporizing chamber 340.

Since the distal end 374 of the post pin 372 engages the proximal end 362 of the fill valve 360, the fill valve is sealed from the tank 273, so oil will not further enter the intake air path 350. It is anticipated that some oil may have entered the fill valve 360 during filling. However, such volume of oil is relatively small, and will be readily vaporized upon initial use of the vaporizer 250.

In the illustrated embodiment, the post pin 372 is conductive, and an insulator 376 is interposed between the post pin 372 and the center post 320, which preferably also is conductive. A first end 378 of the heating coil 344 preferably is connected to the post pin 372. Preferably, a second end of the heating coil 344 is connected to the center post 320. As such, an electric circuit is established from the inner pin 282 of the energized check valve 274 through the conductive spring 370 and conductive fill valve 360 to the post pin 372 into the first end 378 of the coil 344. The electrical energy passes through the heating coil 344 and is communicated from the second end of the coil to the center post 320, from which it flows through the conductive boss 310 to the base housing 272 and further to the outer pin 280.

In the illustrated embodiment, once the vaporizing medium M in the tank 273 has been fully used, the user may disengage the mouthpiece module 260 by unscrewing it from the mount boss 310. In such an occurrence, the conductive spring 370 will again bias the fill valve 360 proximally, engaging the lip 368 with the sealing ring 361 and interrupting the air flow path 350 so that the tank module 270 can be filled without vaporizing medium M flowing past the fill valve 360 and into the intake air path 350. The mouthpiece module 260 can then be reengaged, reestablishing the air flow path 350, reestablishing the seal between the air flow path and the vaporizing medium and reestablishing the electrical circuit providing electricity to the heating element 344.

With reference next to FIGS. 15-21, another embodiment of a personal vaporizer 450 is illustrated. As in previous embodiments, the vaporizer comprises a tank module 270 and a mouthpiece module 260. The illustrated tank module 270 comprises a base housing 272 supporting a tank 273, and the mouthpiece module 260 comprises a mouthpiece 262 having a center post 320 extending therefrom. Much of the structure of the modules is similar to that in the embodiment described above. However, it is to be understood that various specific structural approaches can be taken in still further embodiments.

In the illustrated embodiment, the fill valve 360 comprises a distal nub 369 that extends distally from the distal wall 364. Also, the sealing ring that fits within the mount boss can be shaped somewhat differently. When configured for filling, the fill valve 360 is seated in the sealing ring 361, preferably with the distal wall and lip 368 engaged in a seat 363 of the sealing ring 361 in order to block access between the tank 273 and the intake air path 350. As such, although vaporizing medium M within the tank 273 can enter the fill valve 360, such media is blocked from entering the intake air path 350.

In the illustrated embodiment, the center post 320 comprises an upper post portion 322, which can be formed as part of the mouthpiece 262. The lower post portion 324 is connected to the upper post portion 322 and encloses the wick 342 and heating coil 344. Feeder holes 346 are formed through the lower post portion 324, providing access for media M within the tank 273 to flow into the wick 342. A distal part of the lower post portion 324 is configured to fit within the mount boss 310 in a press fit configuration. As such, a pressing surface 452 of the lower post portion 324 is configured to engage a pressing surface 454 of the mount boss 310 when the mouthpiece module 260 is advanced into engagement with the tank module 270.

The insulating ring 376 disposed between the post pin 372 and lower post portion 324 has an enlarged portion 456 defining a proximal engagement surface 457 that is engaged by a distal engagement surface 458 of the lower post portion 324. The post pin 372 also has an enlarged portion 460 having a proximal engagement surface 462 that is engaged by the distal end 464 of the insulating ring 376. As such, distally-directed forces imposed on the mouthpiece module can be effectively communicated across the engagement surfaces to the post pin 372 so that the post pin can 372 engage and push the fill valve 360 distally while the center post 320 is being pressed into place.

In the illustrated embodiment, as the fill valve 360 is pushed distally by the advancing post pin 372, the lip 368 is moved out of the seat 363, and side holes 366 of the fill valve 360 open communication with the air proximal of the check valve 274. Eventually, the distal nub 369 engages the proximal surface 371 of the check valve 274, establishing a continuous electrical pathway as discussed above.

The pressing surface 452 of the lower post portion 324 preferably is cylindrical and complementary to the tubular mount boss 310 pressing surface 454. However, in the illustrated embodiment, a pair of relief surfaces 466 interrupt the pressing surface 452 of the lower post portion 324. Thus, when the lower post portion 324 enters the mount boss 310, and the pressing surfaces 454, 452 engage, a pair of drain gaps 468 are defined between the mount boss 310 and the relief surfaces 466. The drain gaps provide a pathway for oil that may be within the mount boss 310 to escape as the center post 320 is advanced into the mount boss 310.

When fully advanced so that the distal nub 369 presses firmly against the proximal wall 371 of the check valve, the pressing surfaces 452, 454 of the mount boss 310 and lower post 324 portion are tightly engaged, holding the mouthpiece module 260 and tank module 270 firmly together.

In the illustrated press-fit embodiment, the vaporizer 450 preferably is disposable, and is not refillable. Thus, in the illustrated embodiment there is no spring member to urge the fill valve back 360 into engagement with the sealing ring 361, as the center post 320 is not removable from mount boss 310.

In the illustrated embodiment, the distal nub 369 is formed as an integral part of the fill valve 360. In some embodiments, the distal nub 369 can be formed of a deformable conductive material that elastically deforms when pushed against the proximal wall 371 of the check valve 274, and thus provides a bias to help keep the check valve 274, fill valve 360, and post pin 371 in physical and electrical engagement with one another. In additional embodiments, the distal nub can be shaped and configured to behave somewhat like a spring, in order to provide such bias. In still further embodiments, the distal nub is configured to elastically deform the proximal wall of the conductive check valve so that the proximal wall functions somewhat like a spring, and provides bias.

In some embodiments, the fill valve 360 is integrally formed of brass. As such, the nub 369 can be expected to deform somewhat when pushed against the proximal wall 371 of the check valve 274. The proximal wall 371 of the check valve 274 can also be formed of a material that deforms somewhat, such as brass or, in one embodiment, a zinc alloy with nickel plating. As such, when the nub 369 and proximal wall 371 are forced into engagement with one another, they both deform at least partially elastically, establishing a firm and reliable electrical connection therebetween.

It is also to be understood that embodiments that include a threaded mount boss, such as that disclosed above, can also include a relief slot or other structure configured to enable oil that may be within the mount boss to drain into the tank as the center post is advanced.

Still further embodiments can employ other structure and methods for attaching the center post to the tank valve. For example, in another embodiment the lower post comprises a collet-style connector in which a plurality of clips, each having a radially-outwardly-extending ridge, are pushed into the mount boss, and a receiver slot formed in the mount boss receives the ridge so that the center post is locked in place in the tank module.

Figure 22:
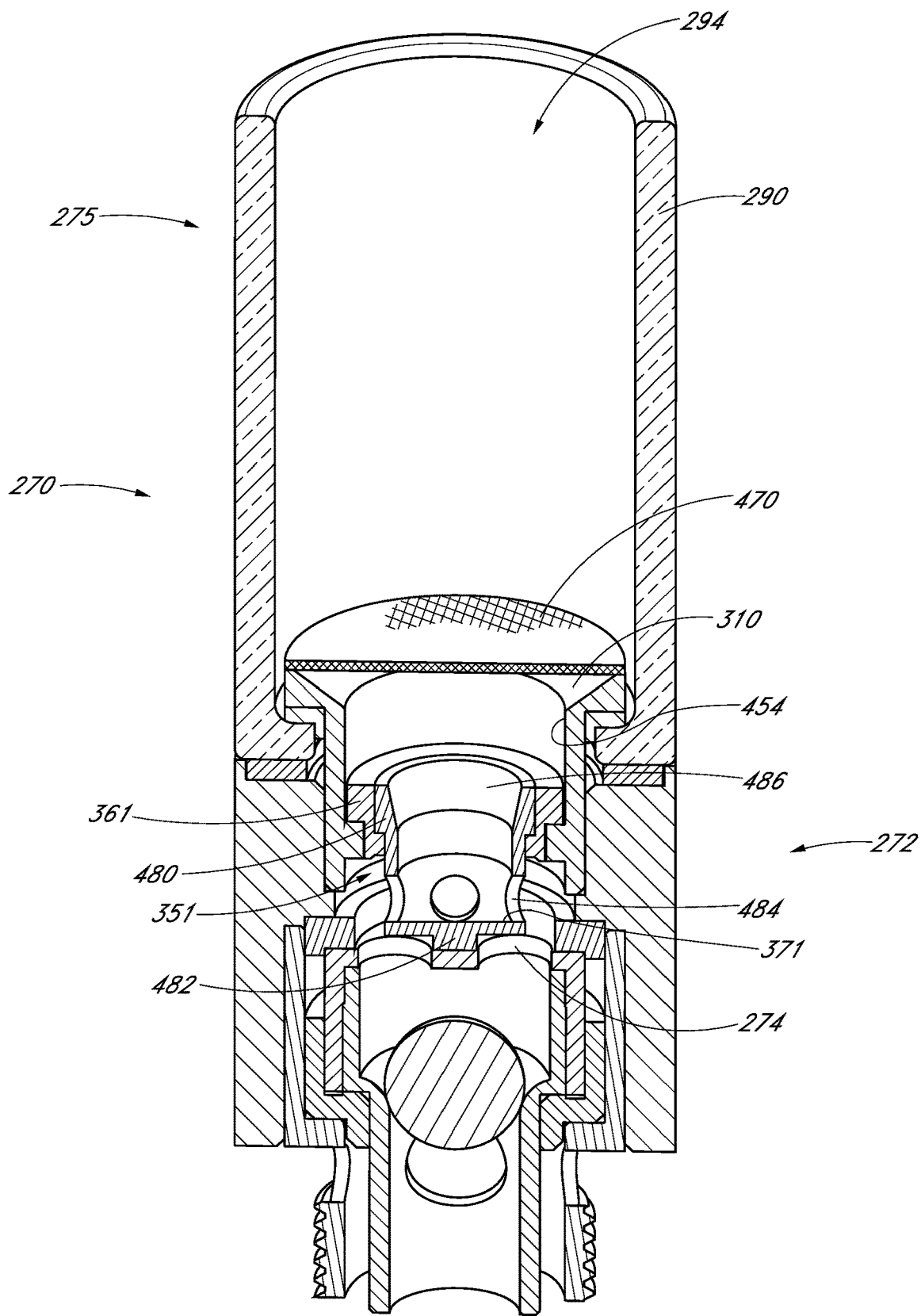
FIG. 22 is a perspective sectional view of a tank module in accordance with another embodiment.
Figure 23:
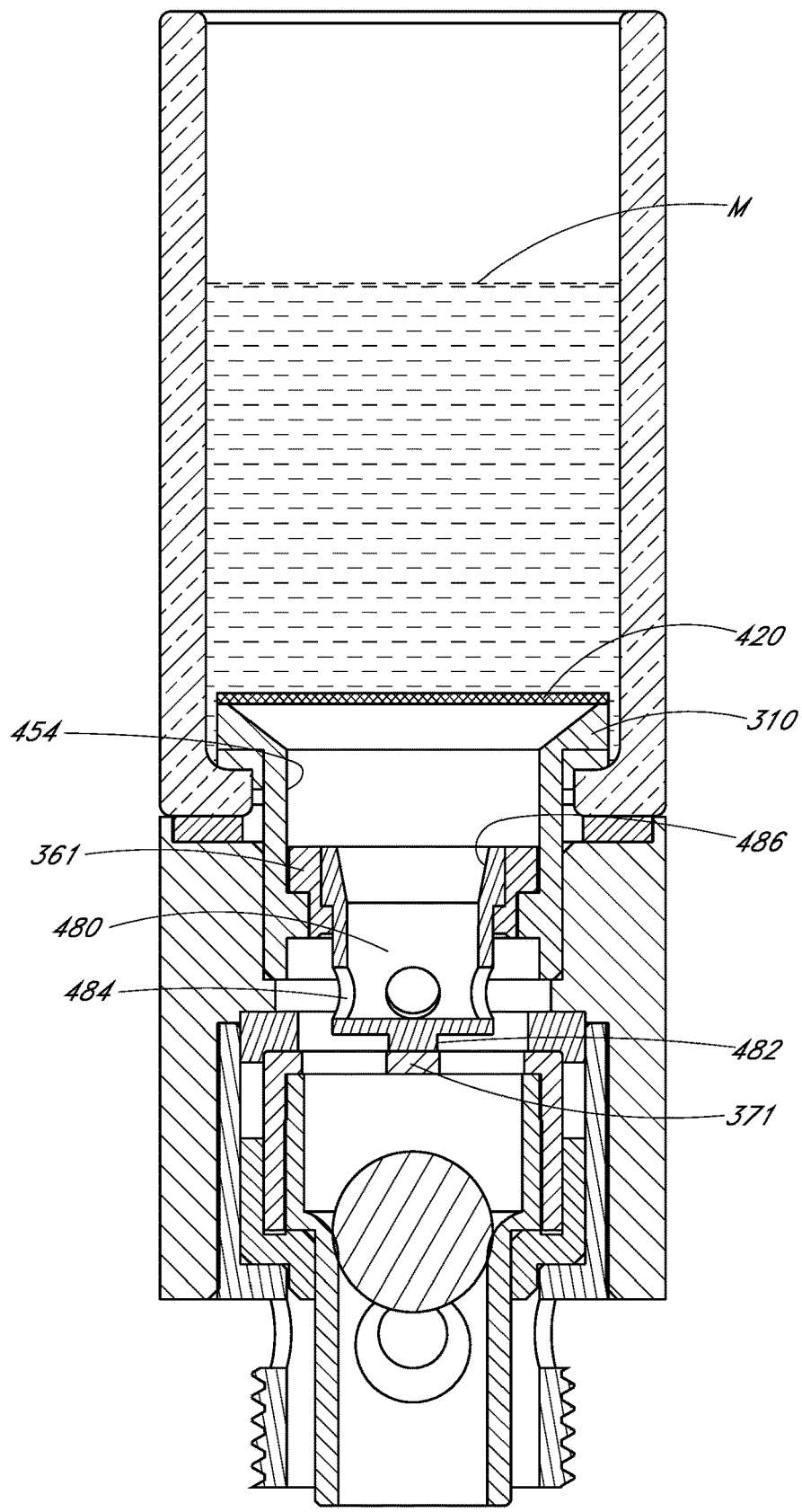
FIG. 23 is a side sectional view of the tank module of FIG. 22.

With reference next to FIGS. 22 and 23, another embodiment is illustrated in which a membrane 470 is installed at a bottom of the tank 273. The membrane 470 blocks oil within the tank 273 from flowing into the air supply path 350. In the illustrated embodiment, the membrane 470 is attached to the proximal surface of the mount boss 310 and extends across the opening defined by the mount boss 310.

Additionally, in the illustrated embodiment, rather than a movable fill valve, a body 480 extends proximally from the proximal wall 371 of the check valve. The illustrated body 480 includes a pin in contact with the proximal wall 371 of the check valve 274, and a plurality of side holes 484 that communicate with the air space 351 proximal of the check valve 274. The body 480 is configured to stay in its position. In the illustrated embodiment, an inner surface of the body includes a tapered part 486 adjacent its proximal end.

Figure 24:
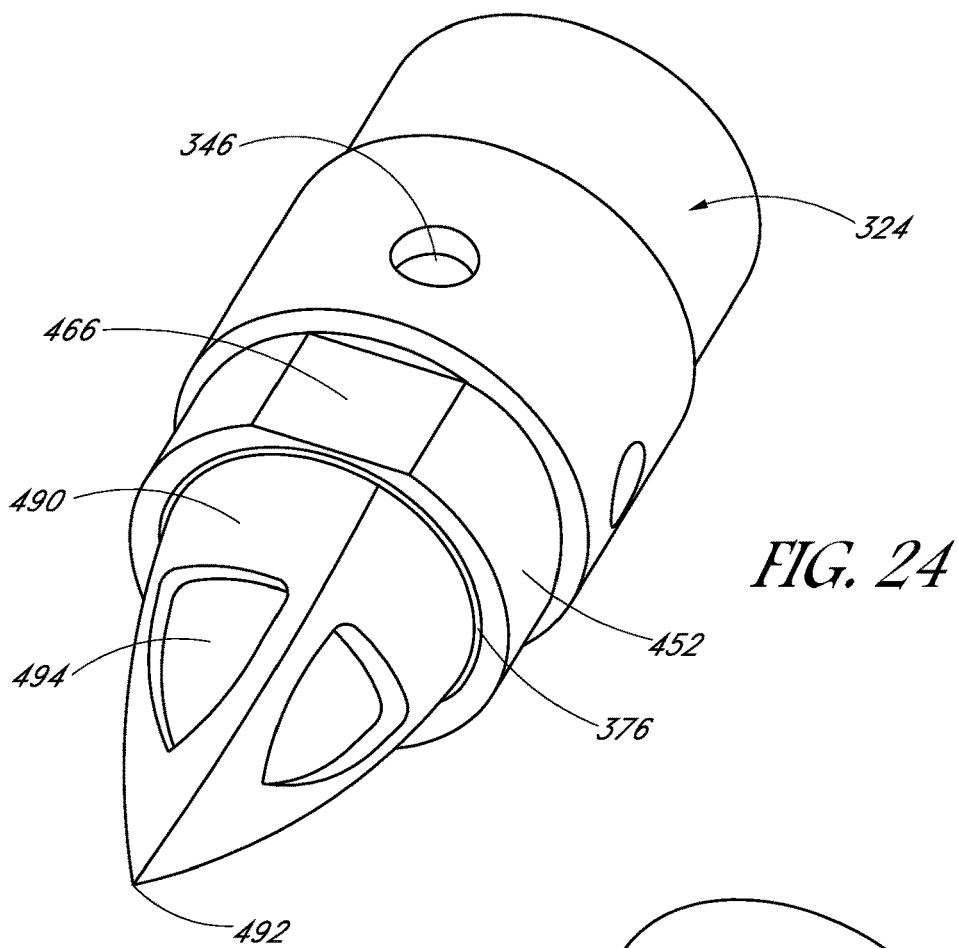
FIG. 24 is a perspective view of another embodiment of s lower post portion.
Figure 25:
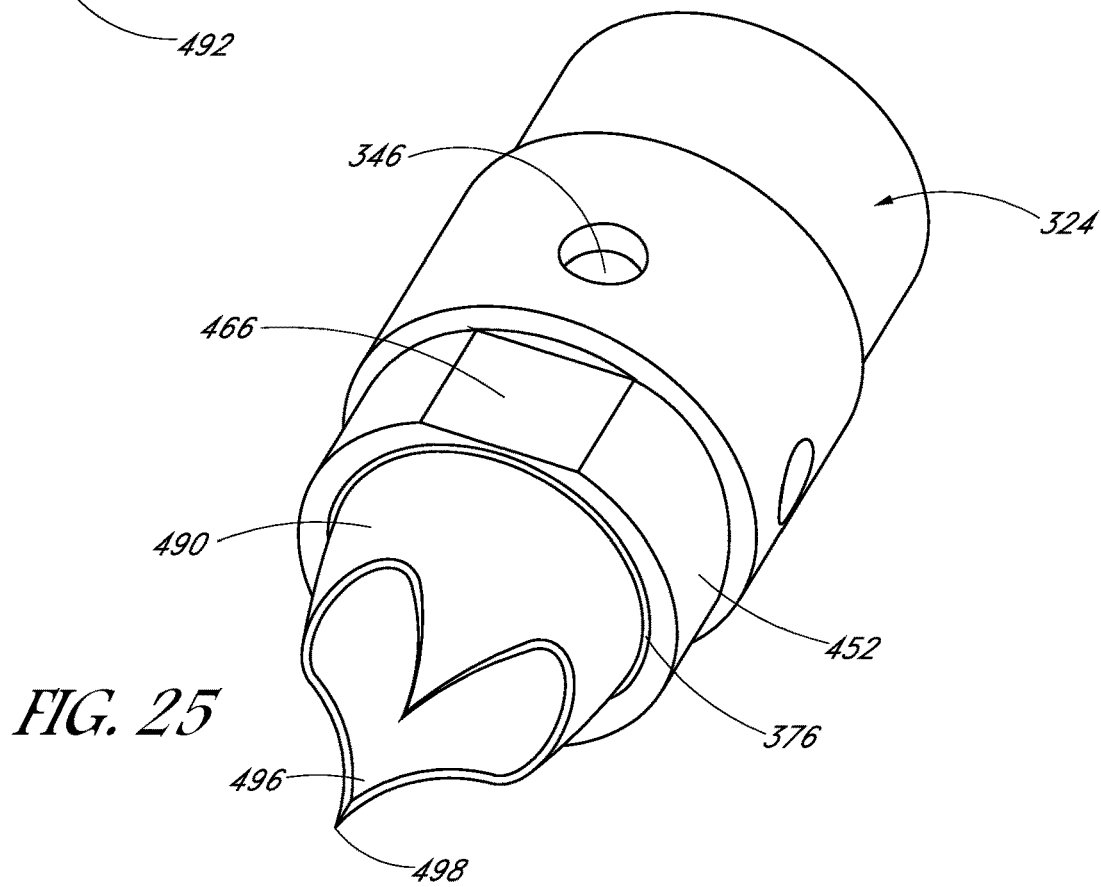
FIG. 25 is a perspective view of yet another embodiment of a lower post portion.

With reference next to FIG. 24, in another embodiment of a lower post portion 324, a pin 490 extends distally, but curves or is angled so as to terminate in a cutting surface 492, which is a point in the illustrated embodiment. Apertures 494 are formed through the pin 490 to enable air to flow into the lower post portion 324. In another embodiment, illustrated in FIG. 25, the distally-extending pin 490 includes a pair of prongs 496, including cutting surfaces that terminate in a point 498. The points in these embodiments are configured to puncture and displace the membrane 470 as the center post 320 is advanced into the tank module 270.

Figures 26, 27:
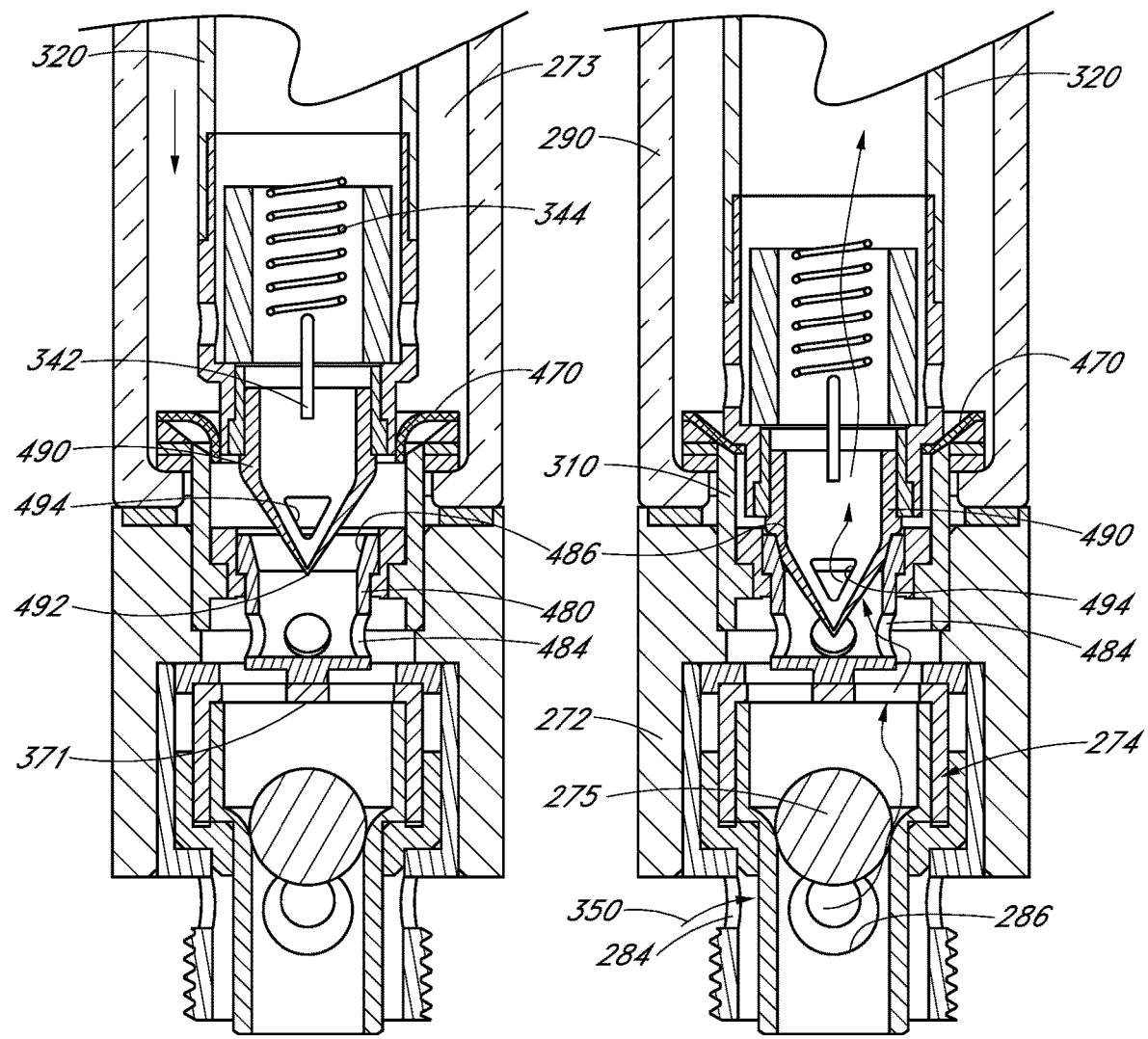
FIG. 26 shows the arrangement of FIG. 23 with the lower post portion of FIG. 24 partially inserted.
FIG. 27 shows the arrangement of FIG. 23 with the lower post portion of FIG. 24 fully inserted.

With reference next to FIGS. 26 and 27, when the center post 320 is advanced distally through the tank 273, the point 492 contacts and punctures the membrane 470. In some embodiments, the membrane 470 is under tension, so that when it is punctured it substantially retracts out of the way. In any case, the post 320 continues to be advanced distally so that the pressing surface 452 of the lower post 324 engages the pressing surface 454 of the tank module 270 so that the center post 320 is held securely in place. Additionally, the pin 490 extends distally and into contact with the body 480, preferably into tight contact in which surfaces of the pin 490 and/or body 480 deform so that a firm and reliable electrical connection is formed between the body 480 and the pin 490.

Figures 28, 29:
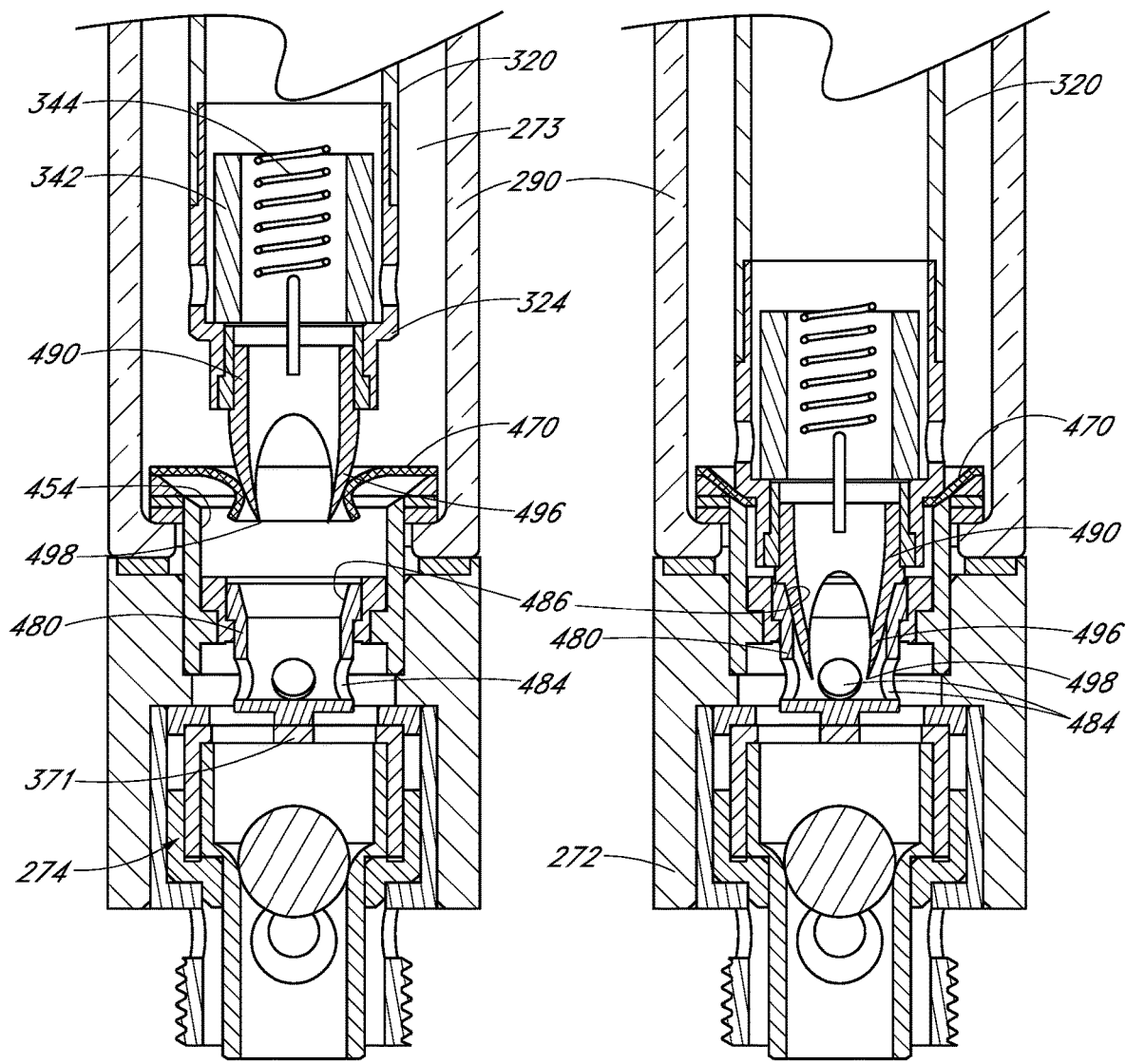
FIG. 28 shows the arrangement of FIG. 23 with the lower post portion of FIG. 25 partially inserted.
FIG. 29 shows the arrangement of FIG. 23 with the lower post portion of FIG. 25 fully inserted.

Similarly, with reference next to FIGS. 28 and 29, a center post 320 embodiment employing prongs 496 punctures and cuts the membrane 470 so that the center post 320 can be secured in position within the mount boss 310. In the illustrated embodiment, the prongs 496 are biased inwardly so that the points 498 pass by the distal end of the body 480, and proximal portions of the prongs 496 engage, for example, the tapered part 486 with sufficient force that the prongs 496 deform, and apply a biasing force against the body 480 that ensures reliable electrical contact therebetween.

As noted above, the membrane 470 blocks oil within the tank 273 from flowing into the air supply path 350. Even when the center post 320 punctures the membrane 470, the center post 320 continues to be advanced, and very little, if any, oil within the tank 273 may flow distally.

It is to be understood that the membrane can be placed in other positions. For example, in another embodiment the membrane can extend across the proximal end of the body. Further, different structures may be employed. For example, the proximal end of the body can extend proximally of the adjacent insulating ring.

It is contemplated that some embodiments may employ mixtures of structure discussed in this specification. For example, in an additional embodiment, an embodiment employs a movable fill valve having a membrane at its proximal end, and the center post employs a pin having a cutting surface that both punctures the membrane and engages and moves the fill valve as the center post is advanced distally.

It is further contemplated that additional embodiment may include the lower post being included as part of the tank module, and the upper post of the center post being part of the mouthpiece module. The proximal end of the lower post is well distal of the tank proximal opening so as to not interfere with filling of the tank. When the mouthpiece module is advanced, the upper post engages and connects (such as via threads or a press-fit) with the lower post. In some such embodiments, the heating element is disposed in the lower post, and the power circuit is already in place. Thus, attaching the mouthpiece module to the tank module has no effect on the power circuit.

Further, although the illustrated embodiments have employed a center post, it is to be understood that, in additional embodiments, an elongated tube that is offset from the axis of the vaporizer can be employed as desired.

The embodiments discussed above have disclosed structures with substantial specificity. This has provided a good context for disclosing and discussing inventive subject matter. However, it is to be understood that other embodiments may employ different specific structural shapes and interactions.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. For example, membranes can be employed with any of the embodiments, if desired. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A personal vaporizer, comprising:
    a tank module comprising a tank and an air path, a fill valve movable from a first position to a second position, the tank being blocked by the fill valve from communicating with the air path when the fill valve is in the first position, at least a portion of the air path being distal of the tank, the tank having an open proximal end, the tank module comprising a tube mount portion distal of the open proximal end; and
    a proximal module comprising an elongated tube having a lumen, the elongated tube extending through the open proximal end of the tank, the proximal module being attached to the tank module when the elongated tube is attached to the tube mount portion;
    wherein when the proximal module is not attached to the tank module the fill valve is in the first position, and when the proximal module is attached to the tank module, the fill valve is in the second position and the air path communicates with the lumen of the elongated tube, the fill valve being blocked by the elongated tube of the proximal module from moving to the first position when the proximal module is attached to the take module.

2. The personal vaporizer as in claim 1, wherein when the proximal module is attached to the tank module, the elongated tube engages the fill valve and blocks the tank from communicating with the air path.

3. The personal vaporizer as in claim 2, wherein the elongated tube and fill valve are configured so that when the proximal module is being attached to the tank module, the elongated tube pushes the fill valve from the first position to the second position.

4. A personal vaporizer, comprising:
    a tank module comprising a tank and an air path, the tank defining a tank lumen and having a tube mount portion, the air path extending from a distal inlet to the tube mount portion, the tank extending proximally from the tube mount portion to a proximal opening; and
    a proximal module comprising an elongated tube having a tube lumen, the elongated tube having a distal end sized and configured to be received by the tube mount portion of the tank module so that the tube mount portion engages and holds the elongated tube distal end;
    wherein when the tank module is in a first configuration in which the elongated tube distal end is spaced from the tank module, communication between the tank lumen and the air path is blocked by a first structure; and
    wherein the proximal module and the tank module are configured so that the proximal module is attached to the tank module by advancing the elongated tube distally through the proximal opening of the tank until the elongated tube distal portion is received by the tube mount portion, and when the elongated tube distal end is held by the tube mount portion, the first structure is modified so as to place the tank module in a second configuration in which the tube lumen is in communication with the air path; and
    wherein the tank module remains in the second configuration when the elongated tube distal end is held by the tube mount portion.

5. The personal vaporizer of claim 4, wherein the first structure comprises a fill valve that is movable between a first position and a second position, and wherein when the fill valve is in the first position it blocks communication between the tank lumen and the air path, and the fill valve is in the first position when the personal vaporizer is in the first configuration.

6. The personal vaporizer of claim 5, wherein when the personal vaporizer is in the second configuration the fill valve is in the second position, and the elongated tube distal end is held by the tube mount portion.

7. The personal vaporizer of claim 4, wherein the first structure comprises a membrane that blocks communication between the tank lumen and the air path, and when the personal vaporizer is in the second configuration the membrane is broken.

8. The personal vaporizer of claim 7, wherein the elongated tube comprises a distal pin having a prong configured to break the membrane when the elongated tube is advanced distally into the tube mount portion.

9. The personal vaporizer of claim 8, wherein the elongated tube is in electrical communication with the tube mount portion when the tank module is in the second configuration.

10. The personal vaporizer of claim 6, wherein the fill valve comprises a proximal opening and at least one side opening, and wherein in the first position the fill valve is engaged with a seal that blocks flow through the at least one side hole, and in the second position the fill valve is not engaged with the seal, the tube lumen communicates with the proximal opening, and the at least one side hole opens into an air space distal of the tube mount portion.

11. The personal vaporizer of claim 10, additionally comprising a spring configured to bias the fill valve toward the first position.

12. The personal vaporizer of claim 4, wherein the tube mount portion comprises a mount surface and the elongated tube distal end comprises an engagement surface, the engagement surface and mount surface configured to engage one another to hold the elongated tube distal end in the tube mount portion, and one of the engagement surface and mount surface comprises a relief surface configured so that as the elongated tube is advanced into the tube mount portion and the engagement surface engages the mount surface, media in the tube mount portion is directed out of the tube mount portion via a drain gap defined by the relief surface.

13. The personal vaporizer of claim 12, wherein the engagement surface and mount surface are threaded.

14. The personal vaporizer of claim 12, wherein the engagement surface and mount surface are configured so that the engagement surface is press-fit into the mount surface.

15. The personal vaporizer of claim 1, wherein when the proximal module is attached to the tank module, the lumen of the elongated tube is in communication with the fill valve, and the air path communicates with the lumen of the elongated tube via the fill valve.

16. The personal vaporizer of claim 15, wherein when the fill valve is in the first position a proximal opening of the fill valve communicates with the tank, and a side hole of the fill valve is blocked by a seal.

17. A personal vaporizer, comprising:
a first portion comprising a tank and an intake air path, the tank defining a tank space configured to contain a vaporizing media, the tank space extending distally from a tank open end to a tank distal end, the intake air path disposed entirely distal of the tank open end;
a second portion comprising a vapor tube and a mouthpiece, the vapor tube defining an elongated lumen, the mouthpiece supported by the vapor tube, the second portion movable relative to the first portion from a first position to a second position, the mouthpiece, vapor tube, and tank further configured so that when the second portion is moved into the second position it is engaged with the first portion in a manner so that it is held in the second position;
wherein when the second portion is in the first position, the lumen of the vapor tube is wholly outside of the tank lumen and is blocked from communication with the intake air path of the first portion; and
wherein when the second portion is in the second position, the lumen of the vapor tube is at least partially disposed within the tank space and is in communication with the intake air path of the first portion.

18. A personal vaporizer as in claim 17, wherein when the mouthpiece is in the second position, the lumen of the vapor tube is blocked from communication with the tank space of the tank.

19. A personal vaporizer as in claim 18, wherein when the mouthpiece is in the second position a flow path is defined from the intake air path through the lumen of the vapor tube and to a mouthpiece lumen, and wherein when the mouthpiece is in the first position the intake air path is blocked from communication with the mouthpiece lumen.

* * * * *